United States Patent [19]

Barr

[11] Patent Number: 5,033,818

[45] Date of Patent: Jul. 23, 1991

[54] ELECTRONIC DIVING SYSTEM AND FACE MASK DISPLAY

[76] Inventor: Howard S. Barr, 1626 Candlelight Glen, Escondido, Calif. 92025

[21] Appl. No.: 297,706

[22] Filed: Jan. 13, 1989

[51] Int. Cl.$^5$ ............................................ G02B 27/14
[52] U.S. Cl. ..................... 350/174; 2/2.1 R; 2/428; 351/158
[58] Field of Search ............... 351/158; 2/426, 2.1 R, 2/428; 350/174; 356/144

[56] References Cited

U.S. PATENT DOCUMENTS

| | | |
|---|---|---|
| 3,712,714 | 1/1973 | Uyeda et al. |
| 4,307,449 | 12/1981 | Strubin |
| 4,336,591 | 6/1982 | Berdzar et al. |
| 4,563,758 | 1/1986 | Paternostro |
| 4,575,722 | 3/1986 | Anderson |
| 4,776,045 | 10/1988 | Mysliwiec et al. ............... 2/428 |

FOREIGN PATENT DOCUMENTS 2126369  3/1984  United Kingdom ............... 2/426

OTHER PUBLICATIONS

Optical Coating Laboratories, Inc. (OCLI), Pricing Information for Colorband TM Color Separation Filters, pp. 36–38.

Primary Examiner—Bruce Y. Arnold
Assistant Examiner—J. P. Ryan
Attorney, Agent, or Firm—Knobbe, Martens, Olson & Bear

[57] ABSTRACT

A diver's information system is disclosed that displays information in the diver's line of sight without substantially obstructing his vision. The diver's system includes a microprocessor, and has an input capability that allows a diver to select one or more dive parameters before a dive. A plurality of sensors, connected to the microprocessor, are provided to monitor parameters such as air tank pressure, depth and water temperature. The system monitors these parameters during the ensuing dive, and provides warnings upon any of a variety of conditions occurring, such as if one or more of the parameters are violated. Throughout the dive, the system periodically stores dive data and any warnings (if present) in a static RAM. Subsequent to the dive, the stored information can be downloaded into an external computer through a provided external port.

The display system of the preferred embodiment includes an LED display that is reflected from a red reflecting mirror affixed to the diver's face mask so that the image of the LEDs is positioned well within the diver's line of sight, but appears to be at a comfortable viewing distance from the diver's eyes, this distance being greater than the distance from the eyes to the mirror. Thus, simply by looking through his face mask, the diver can continuously monitor a display of pertinent dive information such as depth and water temperature, as well as essential information such as air tank pressure.

13 Claims, 12 Drawing Sheets

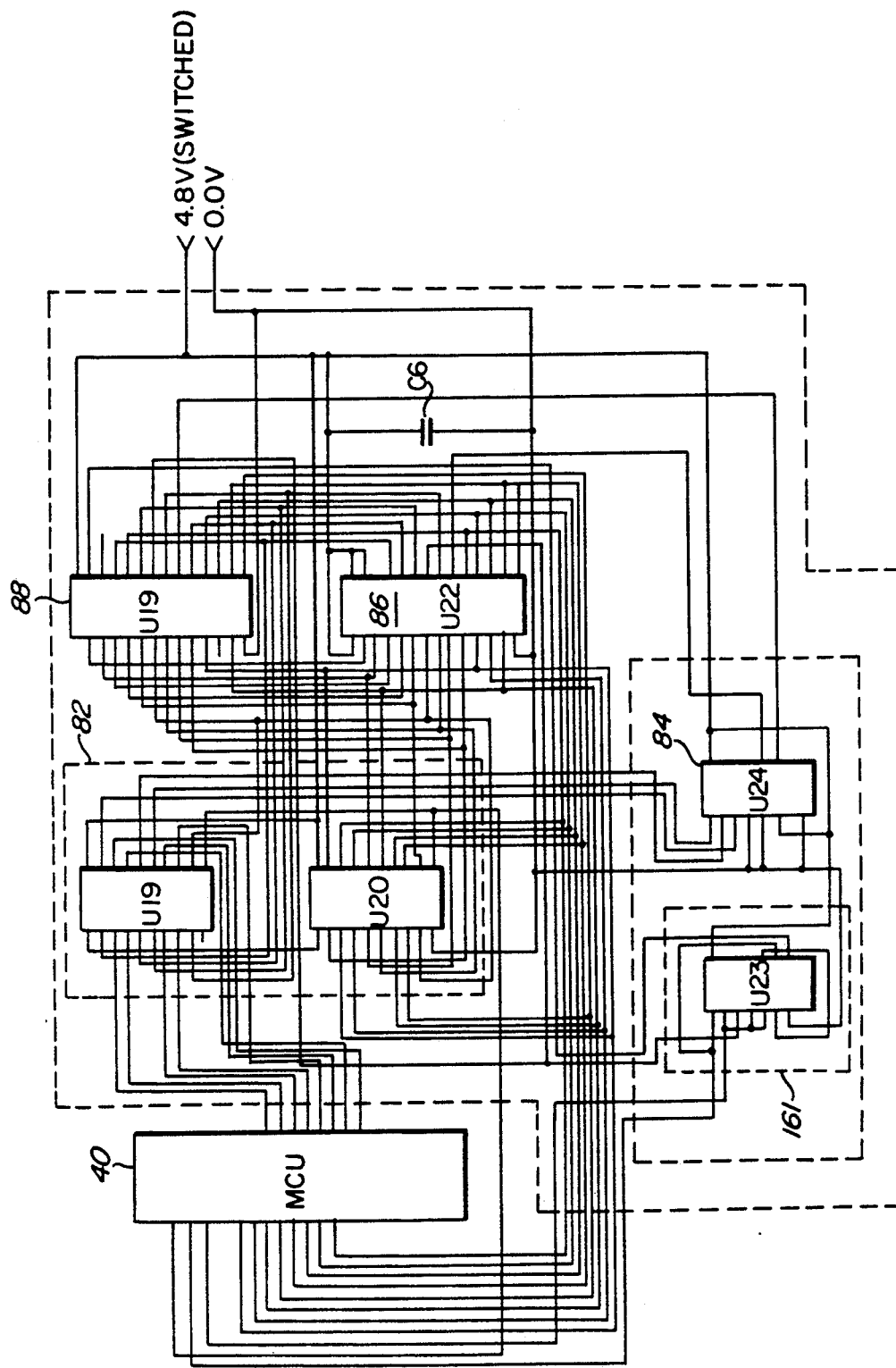

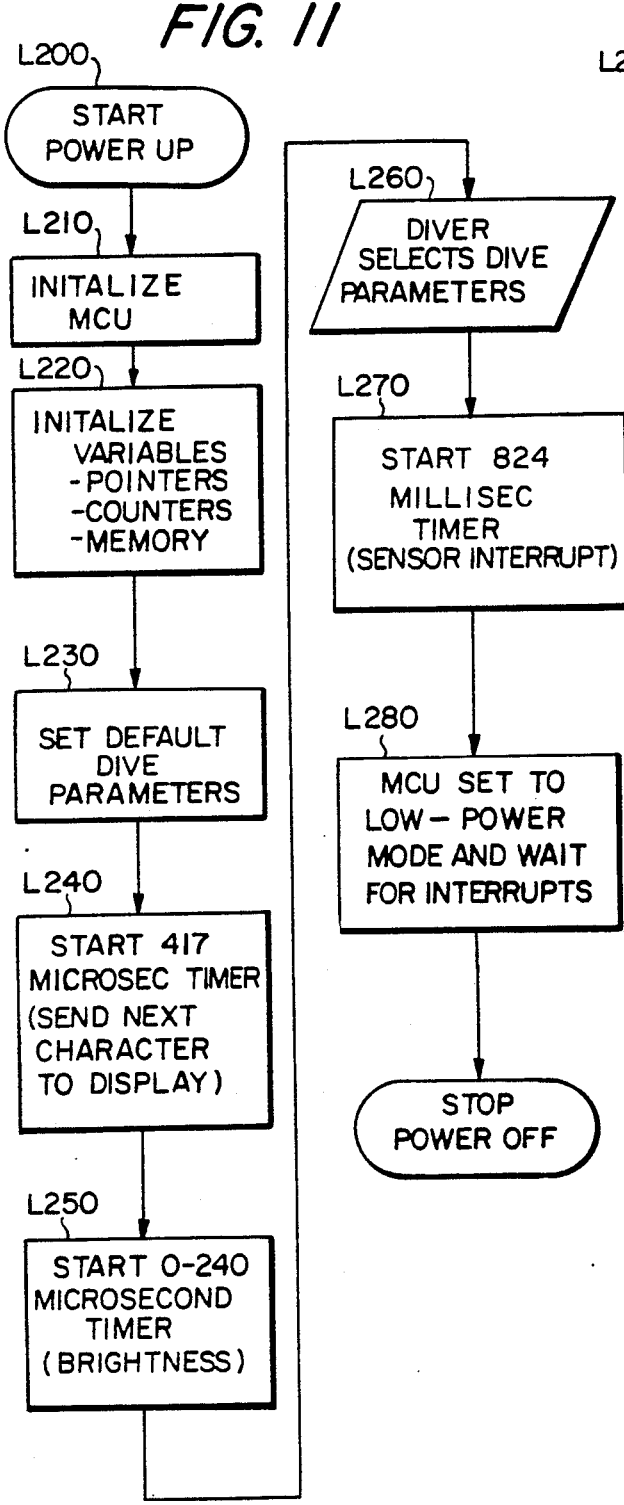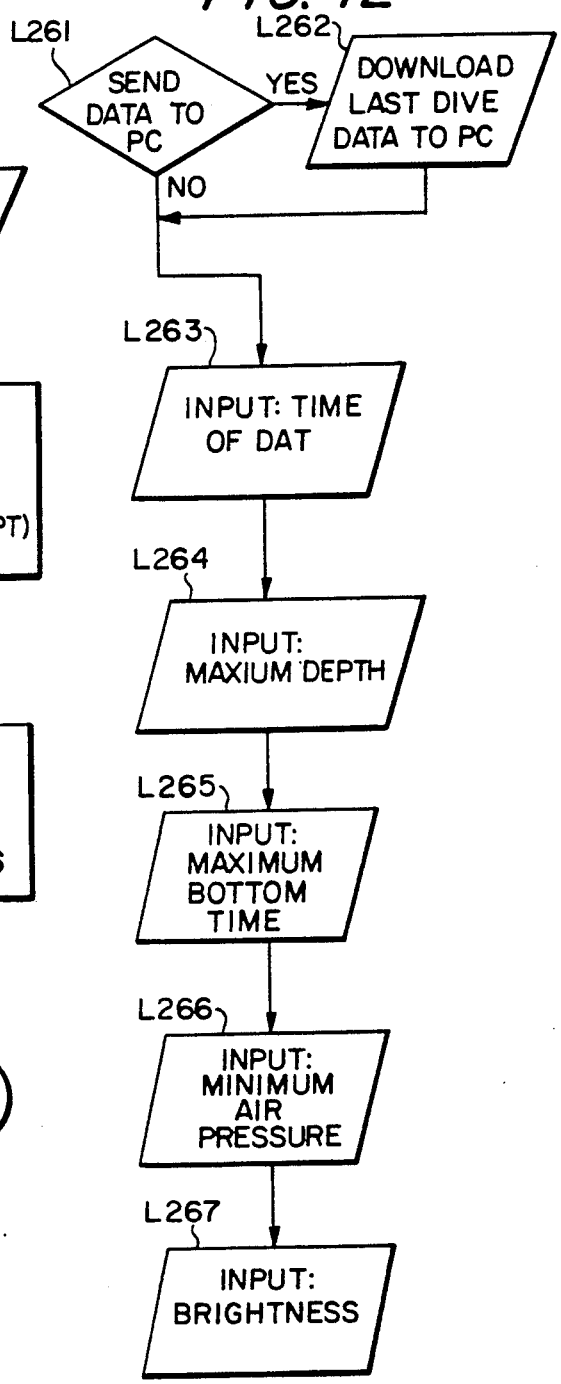

ELECTRONIC DIVING SYSTEM AND FACE MASK DISPLAY

BACKGROUND OF THE INVENTION

1. Field of the Invention

This invention relates to instrumentation systems for use by scuba divers. More specifically, the present invention relates to a display system that displays pertinent dive data directly in the diver's line of sight without substantially obstructing his vision. Furthermore, it relates to a diver's instrumentation system that allows a diver to set his dive parameters before a dive, that monitors these parameters during a dive, and provides warnings when exceeded. Sensors are provided that detect air tank pressure, depth and water temperature. Storage of pertinent dive data including warnings is provided for downloading into an external computer.

2. Prior Art

Since the advent of scuba equipment, divers have been able to remain under water for extended periods of time. (Scuba is a acronym for "Self Contained Underwater Breathing Apparatus"). On a typical dive, a scuba diver may remain underwater for a period of time that often extends from a half hour to one hour. The amount of time spent underwater depends principally upon the rate at which air is used by the diver during his dive which in turn is determined by a number of factors such as the depth of dive, the length of the dive, the diver's physical condition and weight, and the amount of activity exerted in the dive. Other factors that may affect the amount of time spent underwater include subjective factors such as the degree to which the diver is enjoying the dive and completion of the task at hand. Safety, a primary concern, is still another factor affecting the length of time that a diver remains underwater.

Scuba equipment typically includes one or more cylindrical tanks for storing compressed air, an air valve attached to the air tank and a regulator connected to the valve. A typical regulator comprises a apparatus which allows the diver to draw air from the tank as he inhales. While exhaling, the expelled air escapes through passages provided in the regulator.

Regardless of the type of regulator or other breathing apparatus, dive safety is a primary concern, whether the diver be recreational, commercial or even a military diver. Safety plays such an important concern in scuba diving that all dive shops require proof of completion of an accredited diving program as a condition for purchasing compressed air (i.e., having compressed air tanks refilled in preparation for a dive).

One of the most obviously dangerous conditions confronting a scuba diver is the possibility of drowning in the underwater environment. This is a realistic possibility if, while underwater, the diver were to expend all of the air in his air tank. The diver may not be aware of his predicament until he attempts to inhale from the tank and receives nothing. In that suddenly dangerous situation, the diver's alternatives are to either find another source of compressed air (such as from a buddy) or to attempt to surface as quickly as possible. Neither of these alternatives is assured; a buddy may not be close enough to be of assistance, or the surface may be too distant to safely make the ascent. Also, the "quick surfacing" option creates additional dangers which will be described in the following paragraph. The best solution requires the diver to constantly monitor the air available in his tank and to surface with a substantial safety margin of air remaining.

In addition to the danger of drowning, other dangers are associated with breathing compressed air under water. These dangers are familiar to anyone who has completed a diving program and include decompression sickness (the "bends") and air embolism. Decompression sickness results when the diver has been breathing compressed air underwater for an extended period of time. The length of time breathing compressed air that will create a "bends" problem depends upon the depth of the dive and the number of dives that the diver has completed that day. During such an extended period of time breathing compressed air, the blood absorbs a substantial percentage of nitrogen. When the diver ascends, the pressure surrounding his body decreases and if enough nitrogen has built up in his blood, bubbles will form therein, leading to life-threatening decompression sickness. Prevention of decompression sickness is the common solution to this problem. The U.S. Navy has developed decompression tables which, if followed by the diver, allow a substantially safe dive. When using these tables, it is critical to know the maximum bottom time for a given depth, which is defined by the total time a person is underwater for a specific maximum depth of dive. For this purpose, it is often critical to know the maximum depth of the dive and its total elapsed time.

The second problem above-mentioned is that of the air embolism. An air embolism occurs when a diver is ascending while holding his breath. In that case, the air expands in the diver's lungs, causing them to rupture. An air embolism presents a life-threatening situation which has resulted in death. To prevent an air embolism, the diver must always exhale while ascending in order to relieve the excess pressure building up in his lung. Additionally, a cautious diver ascends slowly enough to help minimize the possibility of such an occurrence.

Common safety instrumentation includes an air tank pressure gauge and a depth gauge. Typically these devices have been mechanical, however in recent years, a number of devices including electronic instrumentation have been available. For example, Oceanic ® produces the Data Master, a pressure activated digital data console that can monitor tank pressure, depth, maximum depth, surface interval and count the number of dives. The digital data is displayed on a liquid crystal display housed in a waterproof shell that is connected to the air tank. This product also allows display of other information, such as dive time remaining, "no decompression" information, and a flashing warning indicator that appears ten minutes before a "no decompression" limit to ten minutes after exceeding the limit. Furthermore, a pre-dive planning feature can scroll through programmed depths and displays maximum allowable bottom time based upon previous dive profiles. Also, a temperature display is provided. Other digital gauges, such as the JM Cousteau digital gauges offer digital readouts of diving functions such as tank pressure, current and maximum depth readings, and bottom time.

Neither of these devices is easily viewable. Each system includes a LCD display mounted on a separate module, which is attached to other equipment such as the air tank and buoyancy compensator. To view the data appearing on the LCD display, the diver must make a specific and concentrated effort to find this module. Furthermore, the cumbersome equipment worn by a diver can substantially impede his efforts to locate the display module. Also, a diver commonly becomes preoccupied with the underwater scenery or his current task, and he may simply forget to constantly review the important safety data provided on the display.

To continually apprise the diver of his situation, it has been suggested that mechanical gauges be affixed to the diver's mask outside of his line of sight, in a position opposite two reflecting surfaces affixed to the face mask. The gauges and the reflecting surfaces are all physically located in the water outside of the diver's mask. The two reflecting surfaces are located offset from the usual line of sight, but encompassed by the diver's field of vision. There is also an optical path from the gauges to the reflecting surfaces so that the diver can see the gauges from their reflection. This is a cumbersome and unwieldy arrangement.

SUMMARY OF THE INVENTION

The present invention provides a diver's information system with a compact, easily viewable display of important safety data and other useful information. According to one embodiment, the electronic diving instrumentation allows the diver, before the dive, the flexibility to plan and select dive parameters. During the dive, the instrumentation monitors these and other parameters, and automatically flashes warnings if the pre-entered dive parameters are exceeded. According to the preferred embodiment, an illuminated display is incorporated into the face mask of the diver so that the information can be viewed continually as it is updated. The display is placed within the diver's usual line of sight without obstructing his view of the outside environment. Also, the display is positioned within the diver's mask, free of the corrosive and distorting effects of salt water. Furthermore, the present invention minimizes the number of communication lines between the controller and the mask display to provide a compact, lightweight diver's information system.

The present invention comprises a diver's information system including a microcontroller programmed to perform a plurality of tasks. Upon power-up, the system displays a sequence of selections that allow the diver to set any value for a specific dive parameter, so that the diver can safely plan his dive. When the diver has descended below the surface, a pressure sensor detects this event, and a timer is actuated to begin counting bottom time. During the dive, the microcontroller monitors the value of a plurality of sensors providing data such as air tank pressure, depth, and temperature. These values are calibrated to be independent of battery voltage, so that they are not affected by falling battery voltage during a dive. These values, and other data such as bottom time are compared with the preset dive parameters. If the parameters have been violated, warnings are immediately displayed to the diver. As an additional feature, an embodiment of the present invention includes a non-volatile static RAM that maintains the data stored within it even after a long period of power interruption. The preferred embodiment periodically stores all current dive parameters and warnings in this non-volatile RAM so that a profile of the dive is maintained for later use, by downloading to an external computer.

Furthermore, the present invention provides a display, wholly within the diver's face mask, so that he can easily monitor pertinent dive information provided from the microcontroller and sensors, such as depth and water temperature, as well as essential information such as air tank pressure. In the preferred embodiment, the display includes a series of LED digits in the lower portion of the face mask, a reflective surface on the upper portion, and a partially reflecting surface on the transparent face plate through which the diver views the underwater environment. Thus, the optical path from the LEDs is sufficiently long that the diver that he can comfortably focus on them. In the preferred embodiment, the partially reflecting surface, connected to the inside of the transparent face plate, is a red reflector that substantially reflects only red light while being substantially transparent to all other visible frequencies. Because red light is substantially attenuated as it travels through water, the colors of the underwater environment seen by a diver are substantially devoid of red light. Thus, the diver views the display superimposed on the underwater environment, without substantial obstruction except for the digits. The reflective surface on the upper portion may be a standard silvered mirror that reflects a broad band of colors, or it may be a mirror that reflects only the color of the LED digits.

These and other advantages and features of the present invention will become more fully apparent from the following description and appended claims taken in conjunction with the accompanying drawings.

BRIEF DESCRIPTION OF THE DRAWINGS

FIGS. 7a through 7e illustrate the circuit diagram for the preferred embodiment of the present invention.

FIG. 11 is a flow chart illustrating the sequence from a start at power-up to a stop when the power is off.

FIG. 12 is a flow chart illustrating the sequence of selections made by a diver using the preferred embodiment of the present invention.

DETAILED DESCRIPTION OF THE PREFERRED EMBODIMENT

The invention is best understood by reference to the figures wherein like parts are designated with like numerals throughout.

Figure 1:
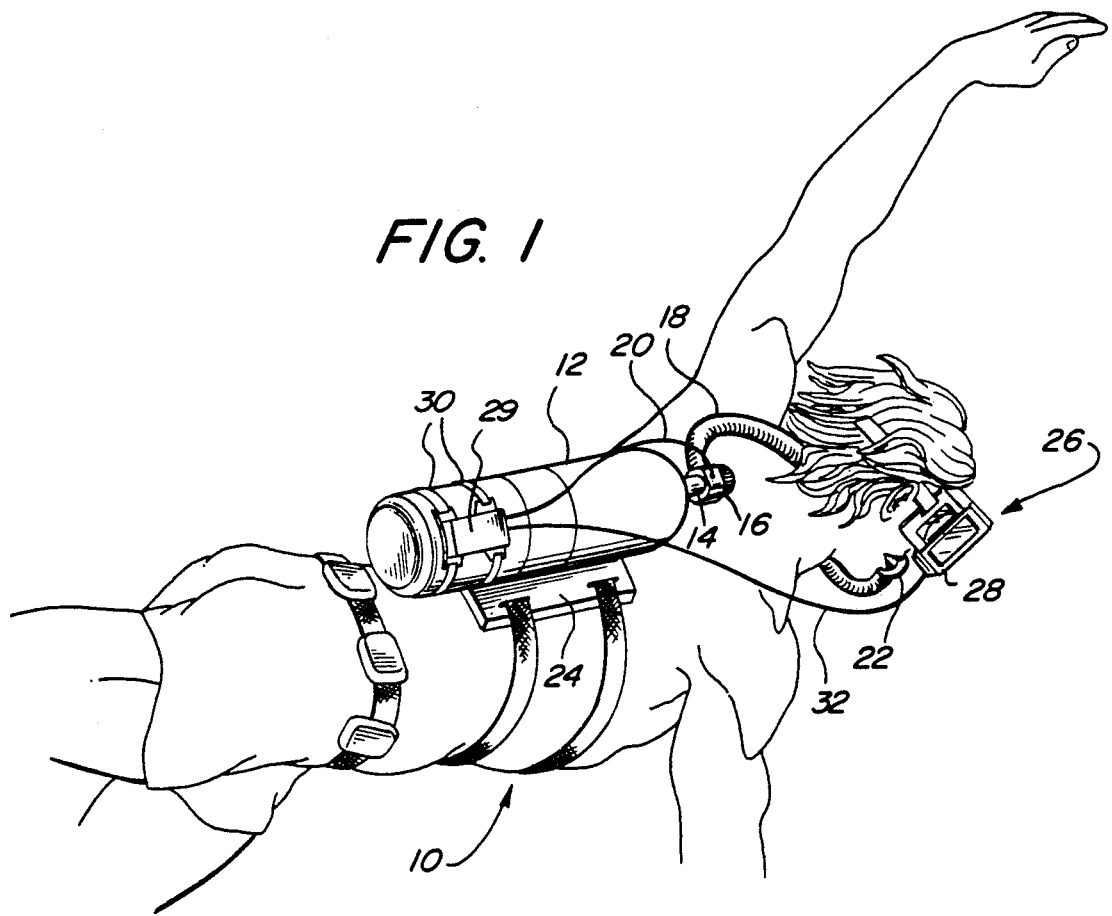
FIG. 1 is a perspective view of a scuba diver wearing scuba equipment incorporating the preferred embodiment of the present invention.

The present invention is used by a diver, illustrated in FIG. 1, who is shown generally at 10. The diving equipment worn by the diver 10 includes a conventional air tank 12 suitable for containing compressed air. A valve 14 is connected to the air tank 12 which can be selectively turned to an "on" position where air can flow through an air passage in the valve 14, or to an "off" position where the air passage is obstructed. A valve fitting 16 is attached to the valve 14. A plurality of conventional air hoses are connected to the valve fitting 16, including a regulator air hose 18 and a pressure sensor air hose 20. The regulator air hose 18 is connected at its other end to a conventional regulator 22, which is held in the diver's mouth for underwater breathing. The air tank 12 is affixed to the diver's torso by conventional means such as a harness 24. The diver 10 wears a diver's mask 26 affixed to his head by conventional means. The diver's mask 26 includes conventional features such as a clear viewing surface through which to view the underwater environment. The face plate 27 (shown in FIG. 3) is surrounded by a frame 28 which provides a substantially waterproof seal with the face plate 27. Furthermore, the frame 28 makes a substantially waterproof seal between the face of the diver 10 and the frame 28 by a flexible seal 25.

The diving instrumentation of the present invention includes an instrumentation box 29, which is connected to the pressure sensor air hose 20 and, in the preferred embodiment, is securely affixed to the diver 10 by conventional means such as straps 30 attached around the air tank 12.

Figure 2:
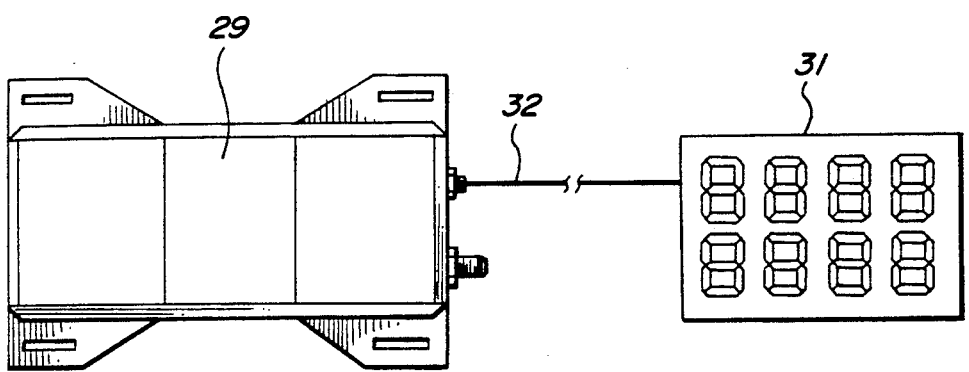
FIG. 2 is a perspective view showing the digital display of the preferred embodiment of the present invention.

The instrumentation box 29 is electrically connected to a display box 31 by a cable 32, which is illustrated in FIG. 2. In the preferred embodiment, the display 31 includes a series of digits formed from combinations of LEDs (light emitting diodes). In other embodiments, the display 31 may comprise an LCD display or any other type of display. Advantageously, the display will be illuminated. The preferred embodiment comprises LEDs (which are inherently illuminating) and in other embodiments, an LCD display may be illuminated with a separate light source. Additional embodiments may provide a display of characters other than digits. Such characters may include symbols recognizable to a diver, for example, symbols identifying the "low air" condition or the "ascent too fast" condition.

The preferred embodiment of the display 31 includes forty digits arranged in two rows of twenty digits. FIG. 2 illustrates fewer digits for ease of drawing and description. It will be recognized to those skilled in the art that more or less digits may be provided in alternate embodiments, or that special characters other than digits may be provided, depending upon the needs of the display.

The Mask Display

In the preferred embodiment, the instrumentation box 29 is electrically connected to the diver's mask 26, which includes the display box 31 which has been described with reference to FIG. 2. In other preferred embodiments, the display box 31 may be physically located elsewhere, such as on the wrist of the diver 10, or at any other position that the diver 10 can visibly access.

Figure 3:
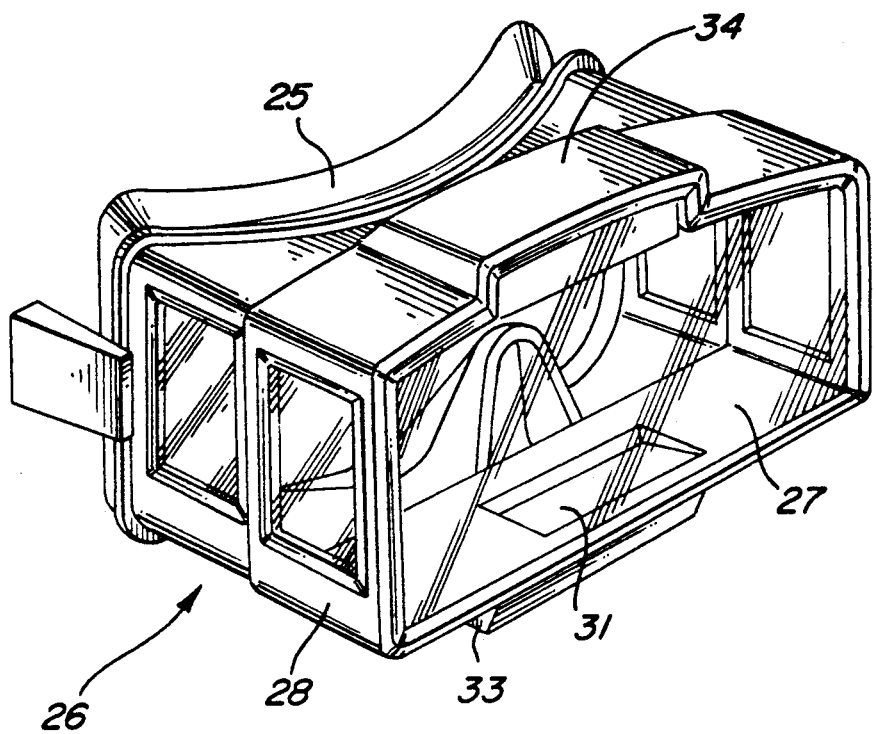
FIG. 3 is a perspective view of a diver's mask incorporating the display of the present invention.

The diver's mask 26 of the preferred embodiment is illustrated in FIG. 3 in perspective. The display box 31 is housed in a lower portion 33, with the displayed digits facing in a direction toward the top of the mask 26. The top of the mask 26 includes an extended portion 34 which provides space for a mirror 35 shown in FIG. 4. The mirror 35 may be a standard silvered mirror that reflects a broad range of colors, or it may be a red reflective filter that reflects the red light emitted from the digital display 31.

Figure 4:
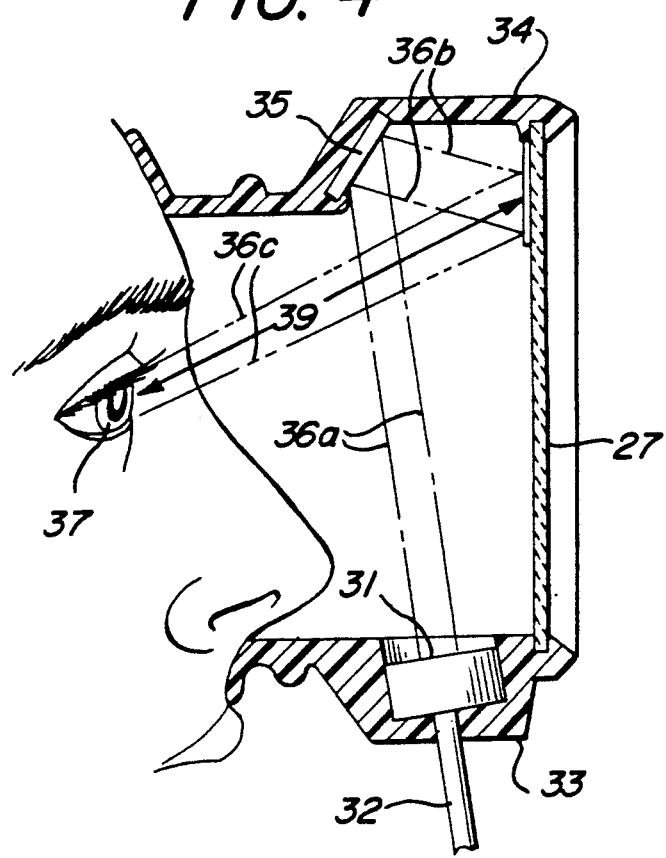
FIG. 4 is a cross section of the diver's mask of FIG. 3 taken in the vertical direction, the mask incorporating the display of the present invention.

Referring now to FIG. 4, a cross section of the mask 26 is shown, illustrating an optical path 36 from the display 31 to the eyes 37 of the diver 10, including three segments 36a, 36b, 36c. The optical path 36 begins at the display 31, which is housed in the lower portion 33 and extends upward along segment 36a to the mirror 35. The light is reflected by the mirror 35 along the segment 36b toward the face plate 27, which supports a partially reflecting mirror 38. In the preferred embodiment, the partially reflecting mirror 38 is a red reflector available from Optical Coating Laboratories, Inc. (OCLI) of Santa Rosa, CA. The red reflector is selected so that it reflects the color of light emitted from the LEDs in the display 31. The nature of the optical coating of the red reflector is such that it may be subject to substantial deterioration in the presence of salt water. To overcome this difficulty, the optical coating may be coated with a conventional water sealer. Alternatively, the side of the partially reflecting mirror 38 having the optical coating may be bonded against a surface of the face plate 27 so that is protected from the adverse effects of salt water. In the latter case, the side of the mirror 38 that remains exposed may include an anti-reflection coating to improve viewability of the reflection from the red reflecting side of the mirror 38.

The partially reflecting mirror 38 reflects the light along the segment 36c in the optical path 36 toward the eyes 37 of the diver 10. In summary, the optical path 36 begins at the display 31, continues to the mirror 35, then to the partially reflecting mirror 38 and terminates in the eyes 37. The total length of the optical path 36 is the sum of the lengths of the segments 36a, 36b, 36c.

Thus, the actual reflection with reference to the eyes 37 is located at a length 39 which is the distance from the eyes 37 to the partially reflecting mirror 38. However, the virtual image, which is what the diver 10 sees, appears at the total distance of the optical path 36, which is substantially longer than the distance 39.

The diver 10 physically cannot focus on an image that appears at the short distance 39 of the reflection, due to physical limitations of the eye in "accommodation," a term used to describe the focussing process of the eye at short distances. The shortest focussing distance possible is termed the "accommodation limit," and it varies from individual to individual. The present invention positions the virtual image beyond the accommodation limit, at the substantially longer distance of the optical path 36, so that the eyes 37 can be comfortably focused on the display 31. It will be apparent to one skilled in the art that an optical path having a sufficient length may be created in any of a plurality of ways, and accordingly the present invention encompasses systems presenting a virtual image at a greater distance than the accommodation limit of the diver 10. For example, in an alternative embodiment (not shown) a diffraction grating may be affixed to the mask, or formed in the face plate thereof, or holographic optical elements may be used to project a virtual image out from the diver's mask to enable him to comfortably view the display. In other alternate embodiments (not shown) the system for imaging the LEDs may include a prism to reflect and bend the light from the LEDs.

It will be apparent to one skilled in the art that the color emitted by the LEDs in the display 31 must be a color that is reflected by the partially reflecting mirror 38, and that any of a plurality of colors may be selected. In the preferred embodiment, the display 31 includes LEDs that emit red light, and the partially reflecting mirror 38 substantially reflects only red light while transmitting the remainder of the visible spectrum. As a result, the red light from the display 31 is reflected back to the diver's eyes 37.

In the underwater environment, red light is substantially attenuated, and therefore the light visible to a diver 10 is substantially devoid of red. In other words, the underwater environment appears mostly blue and green to the diver 10. Therefore, the underwater environment viewed through the red reflecting mirror 38 will not appear much different from the same environment viewed through clear glass. As a result, a diver 10 using the preferred embodiment of the present invention can view the underwater environment substantially unobstructed except for the outline of the digits that are illuminated.

Circuitry of the Invention

Figure 5:
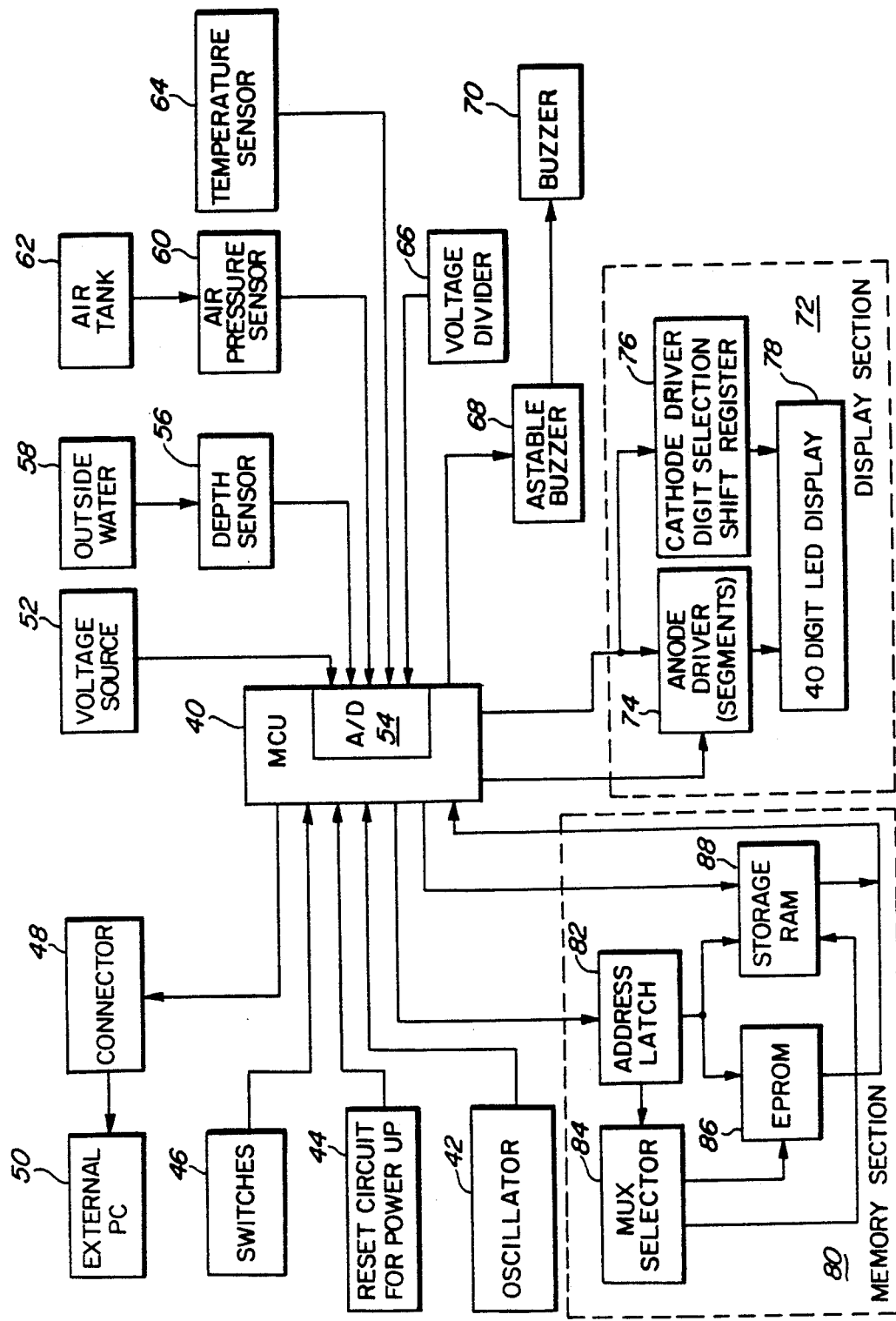
FIG. 5 is a block diagram of the microcontroller, associated circuitry and sensors, and their external connections.

The following description, based on the block diagram of FIG. 5, will describe an embodiment of the circuitry of the present invention in overall terms. Subsequently, the specific contents of each block will be discussed in more detail.

In FIG. 5, an oscillator 42 provides the internal clocking necessary for operation of a microcontroller (MCU) 40. A reset circuit 44 is connected to the MCU 40 to reset the MCU 40 to a known state after power-up of the system. A plurality of switches 46 are connected to the MCU 40 so that the user may provide inputs to the MCU 40 for selection purposes to be described later. A connector 48 is connected to the microcontroller 40 to provide an interface (such as the well known RS-232 interface) with an external PC terminal 50 for purposes such as downloading of data. A voltage source 52 is connected to an analog-to-digital (A/D) section 54 of the MCU 40 to provide a known voltage to the A/D section 54 in order to allow precise sensor calibration. The A/D section 54 is further connected to a depth sensor 56 responsive to the outside environment 58, an air pressure sensor 60 responsive to pressure in the air tank 12 and a temperature sensor 64. Also, a voltage divider 66 or a plurality of such voltage dividers may be connected to the A/D section 54 to detect a low battery condition.

The MCU 40 is also connected to an astable buzzer driver 68 which is in turn connected to a buzzer 70. As a result, the MCU 40 can switch the buzzer 70 to its on or off condition. Preferably, the buzzer 70 is located proximate to a display section 72 which may, for example, be provided on the diver's wrist, face mask or elsewhere. An example of a physical location of the display section 72 is represented by the display box 31 shown in FIG. 3.

Also located in display section 72 is an anode driver 74 for specifying the digit segments of a LED display 78 and a shift register 76 for digit selection. The shift register 76 is comprised of components which drive the cathodes of the LED segments as will be later described. Both the anode driver 74 and the shift register 76 are connected to the MCU 40. Furthermore, both the anode driver 74 and the shift register 76 are connected to the LED display 78 which may, for example, be mounted on the mask of a diver using the present invention.

Memory

In order to provide extended storage facilities and to provide additional programming for the MCU 40 in the preferred embodiment, the MCU 40 is connected to a memory section 80. Within this memory section 80, an address latch 82 is connected to the MCU 40. The address latch 82 is also connected to a multiplexer 84 to access the particular memory device selected by the MCU 40. One of these memory devices is a UV erasable programmable read-only memory (EPROM) 86 which is connected to the multiplexer 84 and a non-volatile storage random access memory (RAM) 88 also connected to the multiplexer 84. Additionally, the address latch 82 is connected to the EPROM 86 and the storage RAM 88 in order to address the respective location within either of the memory devices 86, 88. Furthermore, the storage RAM 88 is connected to the microcontroller 40 to provide read and write capabilities. It will be appreciated by those skilled in the art that additional memory configurations (not shown) or differing components (not shown) may be substituted to provide the desired additional memory or storage capabilities.

Power Supply

The previous discussion has not discussed the power supply connections because the need for such connections and the application of power supplies to satisfy that need is well known in the art. It will be recognized by one skilled in the art that any of a plurality of power supply systems may be utilized to supply the electrical energy necessary to operate the respective blocks.

Figure 6:
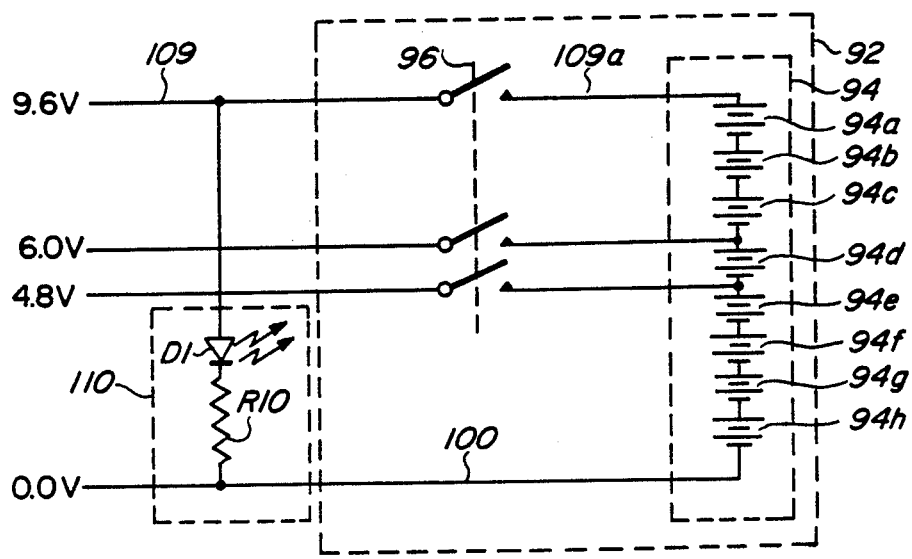
FIG. 6 is an illustration of the power supply of the preferred embodiment.

A preferred embodiment of the power supply is shown in FIG. 6. The power supply indicated generally at 92, comprises a series of battery cells 94, preferably Nickel-cadmium rechargeable battery cells 94a through 94h, each ideally (nominally) providing 1.2 volts. The battery cell 96h, shown at the bottom of FIG. 6, is connected to a line 100 which provides a ground reference. The battery cell 94a, shown at the top of the battery cell 94 in FIG. 6, is connected to a power supply line 109a which provides a nominal voltage of 9.6 volts. Other voltages between 9.6 volts and the reference of zero volts are available by tapping a connection between any of the individual battery cells 94a through 94h. In the preferred embodiment, a connection is tapped between the cell 94c and the cell 94d to provide a six volt output on a line 106a. In a similar manner, a connection is tapped between cell 94d and cell 94e to provide a nominal 4.8 volt output on a power supply line 104a.

The power supply 92 also comprises a switch 96 for switching the power supply on or off as desired by the user. In a preferred embodiment, the switch 96 comprises a triple pole, single throw waterproof switch, effecting the same result as the three single pole single throw switches 96a, 96b and 96c, each of which are connected to switch substantially simultaneously. More specifically, the switch 96a is connected to a line 109 and also to the line 109a to provide a nominal 9.6 volt line when the switch 96a is closed, the switch 96b is connected to line a 106 and to the line 106a to provide a 6.0 volt power supply line, and switch 96c is connected to a line 104 and the line 104a to provide a nominal 4.8 volt power supply line. A power supply "on" indicator, shown generally at 110, is provided to supply a visible indication that the power supply is switched to the on state. The power supply indicator 110 may comprise any of a plurality of indicators well known in the art. In a preferred embodiment, the power supply indicator 110 is connected to the line 109, which supplies a nominal voltage of 9.6 volts when switch 96 is closed. This line 109 is connected to the anode of a LED D1 which is preferably mounted on the instrumentation box 29. The cathode of LED D1 is connected to a resister R10, which on its other end is connected to the ground reference 100. As is well known, when a voltage is applied to the line 109, current will conduct in the forward direction across LED D1 causing visible emission of light, and providing an indication that power is being applied to the system.

Specific Description of Circuitry

Previously, with reference to FIG. 5, the microcontroller (MCU) 40 and its various connections have been discussed in broad, general terms. The following discussion will focus on each of these blocks separately and specifically.

Reference is made to FIGS. 7a through 7e which illustrate in more detail one preferred embodiment of a circuit diagram related to the block diagram of FIG. 5. Those of ordinary skill in the art, will of course, appreciate that various modifications to the circuit diagram of FIGS. 7a through 7e may be easily made without departing from the essential characteristics of the invention. Thus, the following description of the circuit diagram of FIGS. 7a through 7e is intended only as an example and simply illustrates one presently preferred embodiment. The various circuit stages corresponding to each of the functional blocks of FIG. 5 are outlined in FIGS. 7a through 7e by bold dashed lines and are numbered with like numerals.

Circuit diagrams 7a through 7e are related to one another by means of the various lines located along the sides of each figure. In considering the circuit diagrams of FIGS. 7a through 7e, therefore, the Figures are connected together in the appropriate manner, and therefore, the lines should be considered as being electrically connected so as to provide communication between the circuit components illustrated in the several FIGS. 7a through 7e.

In addition, throughout FIGS. 7a through 7e, integrated circuits are represented by a numeral preceded by the letter "U." Resistors and capacitors are designated by numerals preceded by the letters "R" and "C" respectively. Also, switches are designated by numerals preceded by the letter "S" and diodes are designated by numerals preceded by the letter "D."

These specific circuit components which are used in accordance with the preferred embodiment of the diver's information system are identified in Table 1. The data sheets and specifications for each are readily available from the manufacturer. Those skilled in the art will, however, readily appreciate that a wide variety of specific circuit components would also produce acceptable results.

TABLE 1

| REF. DESIGNATOR | PART NUMBER | DESCRIPTION | VENDOR |
|---|---|---|---|
| RESISTORS | | | |
| R1 | | 10M ohm, ¼W, ±5% | |
| R2-R3 | | 100K ohm, ¼W, ±5% | |
| R4 | PR-5ppm-1.50K-.1% | 1.5K ohm, ¼W, ±.1%, 5ppm | Prec. Res. Comp. |
| R5 | PR-5ppm.1.50K-.1% | 1.0K ohm, ¼W, ±.1%, 5ppm | Prec. Res. Comp. |
| R6-R7 | 3299-204 | 200K ohm Potentiometer, 25tn, ⅜" sq. | Bourns |
| R8 | | 18K ohm, ¼W, ±5% | |
| R9 | 1N914 | Small Signal Diode | Motorola |
| R10 | | 6.2K ohm, ¼W, ±5% | |
| R11 | | 10K ohm, ¼W, ±5% | |
| R12 | | 20K ohm, ¼W, ±5% | |
| R13-R19 | MK132-58 | 58 ohm, Precision, sq. Caddock body | |
| CAPACITORS | | | |
| C1, C2 | 1OTCCQ25 | 25 pf, NPO, ±5% | Sprague |
| C3, C6-C8 | 1C20X7R104K050B | .1 µf, ±5%, Tmp. Stble. | Sprague |
| C4-C5 | 1C20X7R103K050B | .01 µf, NPO, ±5%, Tmp. Stble. | Sprague |
| C9 | | .01 µf | |
| CRYSTAL | | | |
| Y1 | 44N088 | 8.00 MHz Crystal, HC-44/U Pkg. | Saronix |
| DIODE | | | |
| D1 | 1N5818 | Schottky, 30V$_R$,1A, DO-15 Package | Motorola |
| D2 | 105CR | Light-Emitting, Super-Efficient | AND |
| SWITCHES | | | |
| S1 | MTE-306D | Waterproof Switch, DPDT, w/B-221 Seal | Alcoswitch |
| S2-S3 | MPE-106F | Waterproof Switch, SPDT, w/B-201 Seal | Alcoswitch |
| CONNECTORS | | | |
| J1 | | 9-pin D sub connector (RS-232 type) | |
| INTEGRATED CIRCUITS | | | |
| U1 | MC68HC811A2 | CMOS Microcontroller | Motorola |
| U2 | XR-L555-M | Low Power Timer | EXAR |
| U3 | AD 580 | Precision Voltage Source | Analog Devices |

TABLE 1-continued

| REF. DESIGNATOR | PART NUMBER | DESCRIPTION | VENDOR |
| --- | --- | --- | --- |
| U4 | LM34CZ | °F. Temperature Sensor (10mV/°F.) | National |
| U5 | UCN-5895A | Serial Input, Source Driver | Sprague |
| U6–U10 | UCN-5821A | Serial Input, Sink Driver | Sprague |
| U11–U18 | 5082-7415 | 7-Segment LED Display | Hewlett-Packard |
| U19–U20 | 74HC373 | Octal Latch | Motorola |
| U21 | DS1225Y | 8K × 8 Non-Vol CMOS RAM | Dallas SemiCond |
| U22 | 27C64Q150 | 8K × 8 CMOS UV Erasable PROM | National |
| U23 | 74HC00 | Quad NAND Gate | Motorola |
| U24 | 74HC138 | 3→8 Decoder | Motorola |
| U25 | LM385Z-1.2 | 1.2 Volt Precision Zener | National |
| TRANSDUCERS | | | |
| 60 | PX-176-5KS-5V | Pressure Transducer | Omega |
| 56 | PX-176-100S-5V | Pressure Transducer | Omega |
| 70 | MSD791701 | Sounducer/Buzzer | TDK |

Figure 7A:
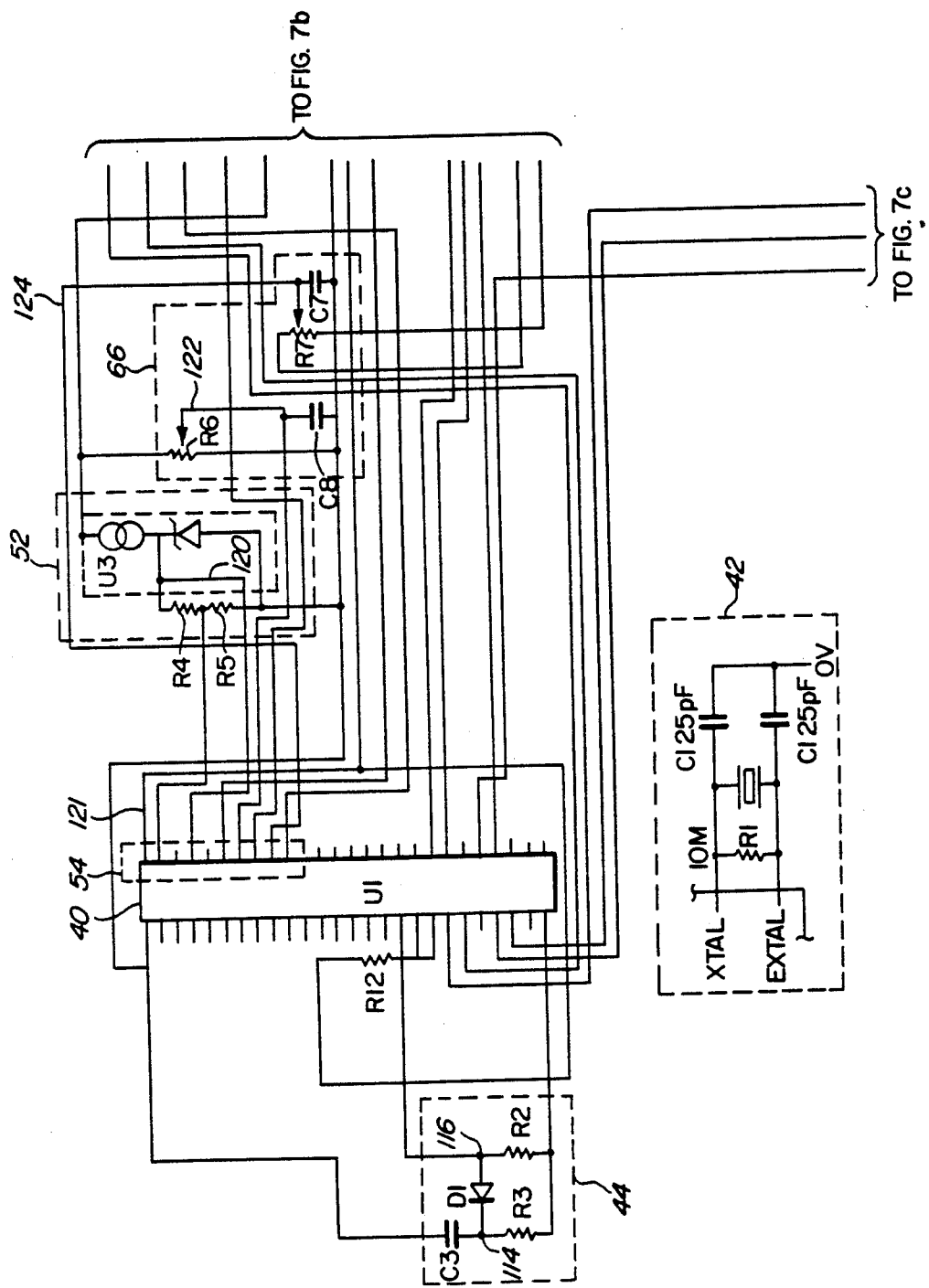

A description of blocks shown in the circuit diagram of FIGS. 7a to 7e follows. Referring now to FIG. 7a, the microcontroller (MCU) 40 of the preferred embodiment is an advanced microcomputer that contains numerous sophisticated on-chip peripheral functions. These on-chip peripheral functions include an eight channel-bit analog-to-digital (A/D) converter, a serial communications interface (SCI) subsystem and a serial peripheral interface (SPI) subsystem. The MCU 40 of the preferred embodiment further contains memory systems including 2K bytes of EEPROM and 256 bytes of static RAM.

The oscillator 42, is preferably a crystal oscillator capable of providing a fixed frequency output. Such oscillators are well known in the art and may take any of a number of forms. The design frequency for the preferred embodiment is 8 MHz.

Referring now to block 44 of FIG. 7a, a reset circuit is provided for the purpose of resetting the MCU 40 to its initial conditions upon power-up (i.e., when the MCU 40 is switched "on") so that all the transient signals inherent in power-up are not interpreted as data or control signals by the MCU 40. The reset circuit 44 is connected to the ground line 100, a reset pin on the MCU 40 and the 4.8 volt line 104. More specifically, the ground voltage on the line 100 is connected to a capacitor C3 which on its other side is connected to the cathode of a Schottky diode D1 and to a resistor R3 at a node 114. The anode of the Schottky diode D1 is connected at a node 116 to the reset pin on MCU 40 and to a resistor R2. Resistors R2, R3 are connected on their other end to the 4.8 volt power supply line 104. The operation of this circuit to reset can be described as follows. Before power-up, both the lines 104 and 100 are at 0.0 volts. Upon power-up, the line 104 substantially immediately has a voltage of 4.8 volts. Initially, the capacitor C3 acts as a short circuit at 0.0 volts, and thus current flows to the node 114 in parallel through the resistor R3 and through the resistor R2 and the diode D1. Thus, the voltage at node 116 is the voltage across diode D1, which is approximately 0.7 volts when conducting. As a result, the reset pin, which is connected to the node 116, is active. As current continues to flow, change builds up on the capacitor C3 and it becomes less and less conductive. As this occurs, the voltage at the node 116 begins to rise. In a very short time, C3 becomes essentially an open circuit and, when that occurs, the voltage across the resistor R2 substantially equals that of the line 104 and the diode is no longer in its conductive mode. Therefore, the voltage at the node 116 has attained a digital high, which is the inactive mode of operation for the reset operation, and the MCU is now reset to its initial condition. Alternatively, other embodiments of the reset circuit 44 may comprise a circuit that is commercially available in an integrated package, such as Part number DS-1231 available from Dallas Semiconductor of Dallas, Tex.

Figure 7B:
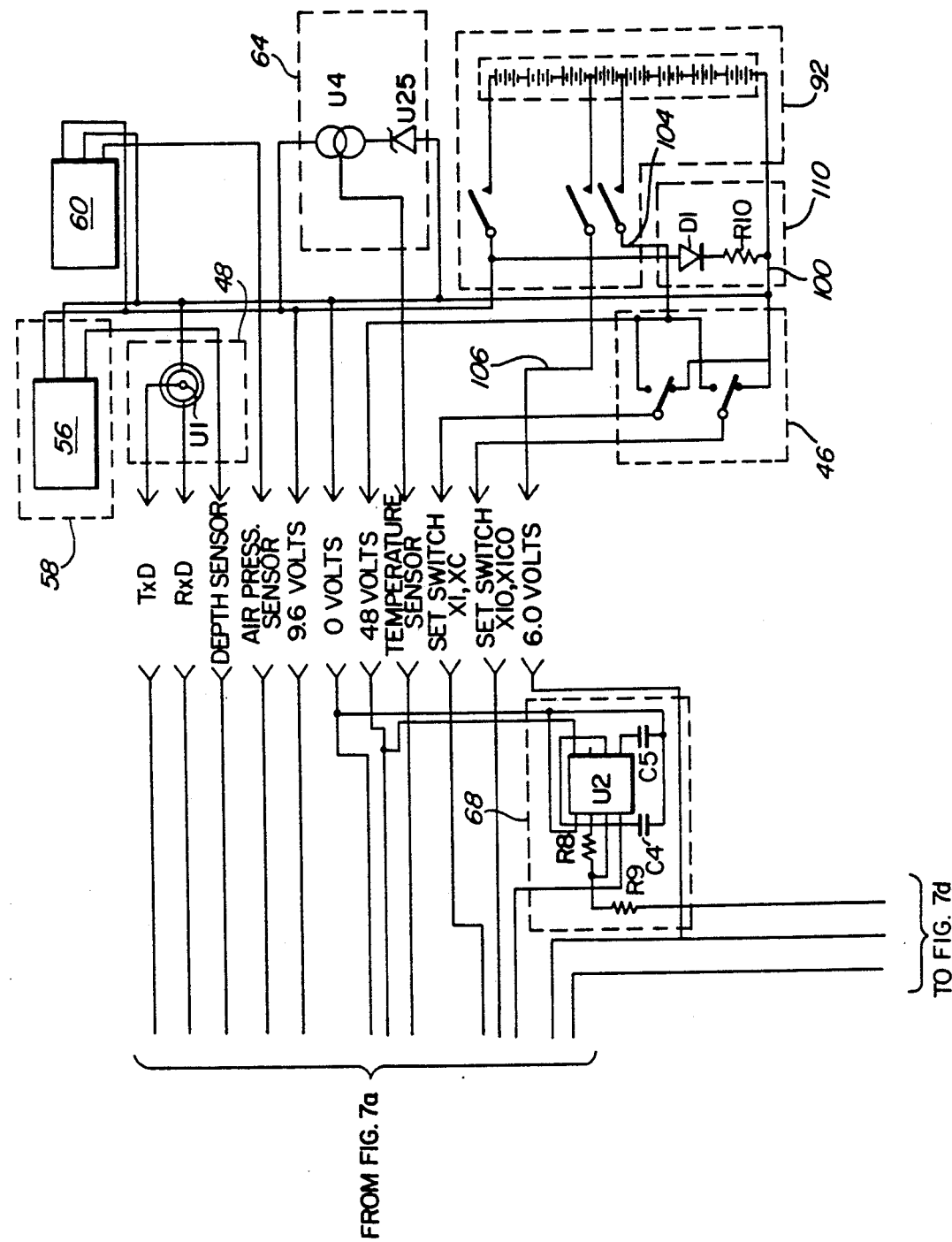

Referring now to FIG. 7b, the switches 46 preferably comprise two user actuable single pole double throw waterproof switches S2, S3. Each switch S2, S3 is actuable separately, and each is coupled to the MCU 40 so that the user can communicate with the MCU 40. When not actuated, each switch S2, S3 has an output of 0.0 volts. When actuated, each switch S2, S3 closes a circuit that applies a high digital voltage to the respective input of the MCU 40.

In the preferred embodiment, the power supply on the line 104 is connected to one side of switch S3, S2 and the other side of the switch is connected to the ground line 100, so that each switch is actuable separately between either a voltage of 4.8 volts (digital "high") on the line 104 or the ground reference 100 at 0.0 volts (digital "low"). As a final note, the outputs of the switches S2, S3, as applied to the MCU 40 are used by the software in a manner that will be described in order to permit the user to select any of a number of options available through the software as will be later described.

Referring now to FIG. 7b, the connector 48 is provided as a port between the MCU 40 and an external PC terminal 50 (See FIG. 5). In the preferred embodiment, this port comprises a conventional RS-232 port.

Referring now to FIG. 7a, the voltage source 52 comprises a precision voltage source U3 that provides a 2.5 volt reference output on a line 120 that is connected to the analog to digital (A/D) converter 54 of the MCU 40. In addition, the 2.5 volt output on the line 120 is further divided by a precision resistor R4 and a precision resistor R5 to provide a 1.0 volt reference voltage on the line 121, which is connected to the A/D converter 54. The purpose of these two reference voltages as applied to A/D converter 54 will be described more specifically in the following discussion and also in relation to the voltage compensation system described later in the specification.

In the A/D converter 54, the 1.0 volt reference sets a zero digital value for conversion purposes. Therefore, $V_L = 1.0$ volt. The maximum digital value FF (which corresponds to 255 in decimal) is set by another voltage input which, in the preferred embodiment, is 4.8 volts, the nominal voltage on the line 104. Therefore, $V_H$ is ideally equal to 4.8 volts. Using these two voltages (4.8 and 1.0 volts) as a range, the A/D convertor 54 automatically converts the analog voltage appearing at any of a plurality of A/D inputs to the nearest digital value between 0 and FF. Such conversion is essential for digital processing of the analog inputs that are described in the following discussion.

Voltage Compensation and the Sensors

It will be recognized by those skilled in the art that the voltage appearing on the line 104 ($V_H$) will not equal 4.8 volts if the battery voltage has fallen. However, because $V_L(=1.0\text{ volt})$ is provided by precisely dividing the 2.5 volt precision voltage source U3, VL will remain at 1.0 volt while $V_H$ may be changed from 4.8 volts. Therefore, digital values obtained after A/D conversion may be inconsistent if, for example, an analog voltage is converted with $V_H$ equalling 4.8 volts, and then after $V_H$ has fallen, another conversion is made with that identical analog voltage. This inconsistency will be seen in the following example. The digital value (DV) for any A/D conversion of an analog value ($V_{in}$) to its digital value $DV_{in}$ is given by:

$$\text{Digital Value } (DV_{in}) = \frac{(V_{in} - V_L)}{(V_H - V_L)} \cdot 255 \quad (1)$$

As discussed, $V_L$ will always equal one volt.

For an analog input of 2.0 volts, and if $V_H = 4.8$ V, then:

$$DV_1 = \frac{(2.0 - 1.0)}{(4.8 - 1.0)} \cdot 255 = 67$$

For the same analog input of 2.0 volts, but if $V_H = 4.5$ V, then:

$$DV_2 = \frac{(2.0 - 1.0)}{(4.5 - 1.0)} \cdot 255 = 73$$

A comparison of the two results, shows that a 0.3 volt drop of $V_H$ has caused a rise of the digital value from 67 to 73 while $V_{in}$ has remained constant.

This inconsistency can be compensated by using the 2.5 volt reference voltage input to the A/D converter 54 which has a constant analog value regardless of falling battery voltage.

$$DV_{REF} = \frac{(2.5 - 1.0)}{(V_H - 1.0)} \cdot 255$$

After algebraic manipulation:

$$V_H = \frac{1.5(255)}{DV_{REF}} + 1 \quad (2)$$

Therefore, $V_H$ can be calculated from $DV_{REF}$. Because $DV_{REF}$ is continually available at the A/D converter 54 the actual value of $V_H$ can be continually calculated.

Using this result, the outputs of the sensors 56, 60, 64 can be compensated to give consistent measurements despite falling battery voltage. Each of these sensors 56, 60, 64 and the method of compensation of measurements made by each of them is discussed in more detail in the following paragraphs.

Reference is now made to FIG. 7b, wherein a depth sensor 56 is illustrated. The depth sensor 56 provides an analog voltage output that varies with depth. The depth sensor, more generically, is a pressure transducer that provides an output voltage responsive to the sensed pressure, many of which are commercially available. The preferred embodiment includes a pressure transducer, Part No. PX-176-100S-5V manufactured by Omega Engineering. The analog output of the depth sensor 56 is connected to the A/D convertor 54 which substantially continuously translates the analog output into a digital value. Of course, effectiveness of the depth sensor 56 requires that it be responsive to the water pressure at the depth of the diver. This is shown symbolically in FIG. 7b as a connection between the depth sensor 56 and the outside environment 58.

Reference is again made to FIG. 7b, wherein an air pressure sensor 60 is illustrated. More generically, the air pressure sensor 60 is a pressure transducer that provides an analog voltage output responsive to the sensed pressure. The output of the air pressure sensor is connected to the A/D converter 54 so that a digital value of the air pressure is substantially continuously available to the MCU 40. It should also be noted that the air pressure sensor 60 is connected to the diver's air tank 12 as also shown in FIG. 1. Such connections, as by an air hose, are well known in the art. In the preferred embodiment, the air pressure sensor 60 is Part No. PX-176-5KS-5V, produced by Omega Engineering.

In FIG. 7b, the temperature sensor 64 is illustrated. In the preferred embodiment, the temperature sensor 64 comprises a precision Fahrenheit temperature sensor 44 whose output voltage is linearly proportional to the outside temperature. In order to provide the proper reference voltage for compatibility with the MCU 40 chosen in the preferred embodiment, a precision micropower voltage reference diode U25 is supplied as a bottom limit reference voltage.

The temperature sensor 64 is connected to the A/D convertor 54 so that the analog output of the temperature is substantially continuously converted to its digital value to be used by the MCU 40, in a manner to be later described with reference to the software.

The compensation for falling battery voltage for each of the sensors 56, 60, 64 will now be explained. As discussed above, each of the sensors 56, 60, 64 is connected to the A/D converter 54 which provides a continuous digital value to the MCU 40 for the output of each sensor 56, 60, 64.

In the preferred embodiment, the analog voltage output of the depth sensor 56 is linearly related to the pressure. More specifically, the preferred embodiment of the depth sensor 56 provides an output ranging from 1.0 to 6.0 volts that varies linearly with an input of from 0.0 to 100.0 pounds per square inch (PSI) which corresponds to a depth of 0.0 to 225.5 feet.

Therefore the depth (in feet) as a function of the output voltage of the depth sensor 56 ($V_{OUT}$) is:

$$\text{Depth} = \frac{V_{OUT1} - 1.0}{6.0 - 1.0} * 225$$

After A/D conversion, as in Equation (1), the digital value ($DV_{depth}$) is:

$$DV_{depth} = \frac{V_{OUT1} - 1.0}{V_H - 1.0} * 255$$

It has been discussed that $V_H$ may vary with battery voltage, and that the actual value for $V_H$ may be calculated from $DV_{REF}$, in accordance with Equation (2). Using that equation and the previous two equations, we can calculate a compensated value for depth:

$$\text{Depth (compensated)} = \frac{DV_{depth}}{DV_{REF}} * 67.5 \text{ (ft)}$$

Thus, an accurate value for depth can be obtained, independent of battery voltage fluctuations.

In the preferred embodiment, the analog voltage output of the air pressure sensor 60 ($V_{out2}$) is linearly related to the air pressure sensed in the air tank 62. More specifically, the preferred embodiment of the pressure sensor 60 provides an output that ranging from 1.0 volts to 6.0 volts that varies linearly with an input of from 0.0 to 5000 PSI. Therefore, the air pressure as a function of the output of the sensor 60 ($V_{OUT2}$) (in PSI) is given by:

$$\text{Air Tank Pressure} = \frac{(V_{OUT2} - 1.0)}{(V_H - 1.0)} * 5000 \text{ (PSI)}$$

After A/D conversion using Equation (1), and then adjusting $V_{out2}$ using Equation (2) to account for the possibility of dropping battery voltage, and after algebraic manipulation, the compensated digital value is found to be:

$$\text{Air Tank Pressure (compensated)} = \frac{DV_{air}}{DV_{REF}} * 1500 \text{ (PSI)}$$

It will be recognized to those skilled in the art that the specific equations set forth above may be modified easily if a pressure sensor 60 with characteristics different from the preferred embodiment were to be used. With appropriate software modification, the compensation method of the present invention may be used with a wide variety of sensors in addition to the pressure and temperature sensors described herein.

The temperature sensor 64 includes the precision Fahrenheit sensor U4 and the diode U25. The sensor U4 in the preferred embodiment provides an output of 10.0 mV/°F. within the range of $-50°$ F. to 300° F. The diode U25 provides a typical reference of 1.235 volts. Thus, the analog output voltage from the temperature sensor 64 ($V_{out2}$) is the sum of the contributions from the sensor U4 and the diode U25, or:

$$V_{out3} \text{ (volts)} = \text{Temperature} * 0.0100 \text{ volts/° F.} + 1.235$$

Again, using Equation (1) to perform the A/D conversion, and compensating for a change in $V_H$ using Equation (2), the Fahrenheit temperature is given by:

$$T \text{ (°F.)} = \frac{150 * DV_{temp}}{DV_{ref}} - 23° \text{ F.}$$

Low Battery Test

Reference is now made to FIG. 7a, wherein the voltage dividers for the low battery test are illustrated. The voltage dividers are provided for the purpose of dividing an output voltage greater than 4.8 volts down to a value within the range between the highest (4.8 volts) and the lowest (1.0 volts) voltage that can be converted by the A/D converter 54 in the preferred embodiment. One of the voltage dividers is represented by the potentiometer R6 which is connected to the 9.6 volt reference on the line 109. The potentiometer may be adjusted in a known manner to provide the desired output voltage, for example, it may be adjusted to provide an output on a line 122 of 2.7 volts. Similarly, another voltage divider, shown by potentiometer R7 is adjusted to also provide an output of, for example, 2.7 volts on a line 124. The lines 122, 124 are connected to the A/D convertor 54 so that their corresponding digital values are substantially continuously available to the MCU 40. In the preferred embodiment, thus, the low voltage checks occur at the 9.6 volt and the 6 volt level, in order to monitor both the interior battery stack and a portion of the stack. It will be recognized to those skilled in the art that additional lines and additional voltage dividers (both of which are not shown) may be provided which monitor the voltage at connections between the battery cells 96a through 96h as shown in FIG. 7b. In addition, the voltage on the line 104, which is the 4.8 volt line connected to the upper voltage level on the A/D converter 54, may be monitored similarly for a low voltage condition.

Referring again to FIG. 7b, an astable buzzer driver 68 is illustrated. This buzzer driver is connected to the MCU 40 and is actuable thereby. Control of the buzzer driver 68 resides in software used by the MCU 40. Numerous astable buzzer drivers are known in the art, and the preferred embodiment is only one example of such a buzzer driver. As an example of the number of drivers that are available, the IC Timer Cookbook contains a plurality of examples of oscillating circuit drivers. The output of the astable buzzer driver is connected to a buzzer 70 which is shown in FIG. 7d. A purpose of the buzzer 70 is to advise the diver of an emergency situation or to otherwise bring the diver's attention to the display. The preferred position of the buzzer 70 is on or near the diver's mask. The construction of such buzzers is well known in the art.

The Display

Figure 7C:
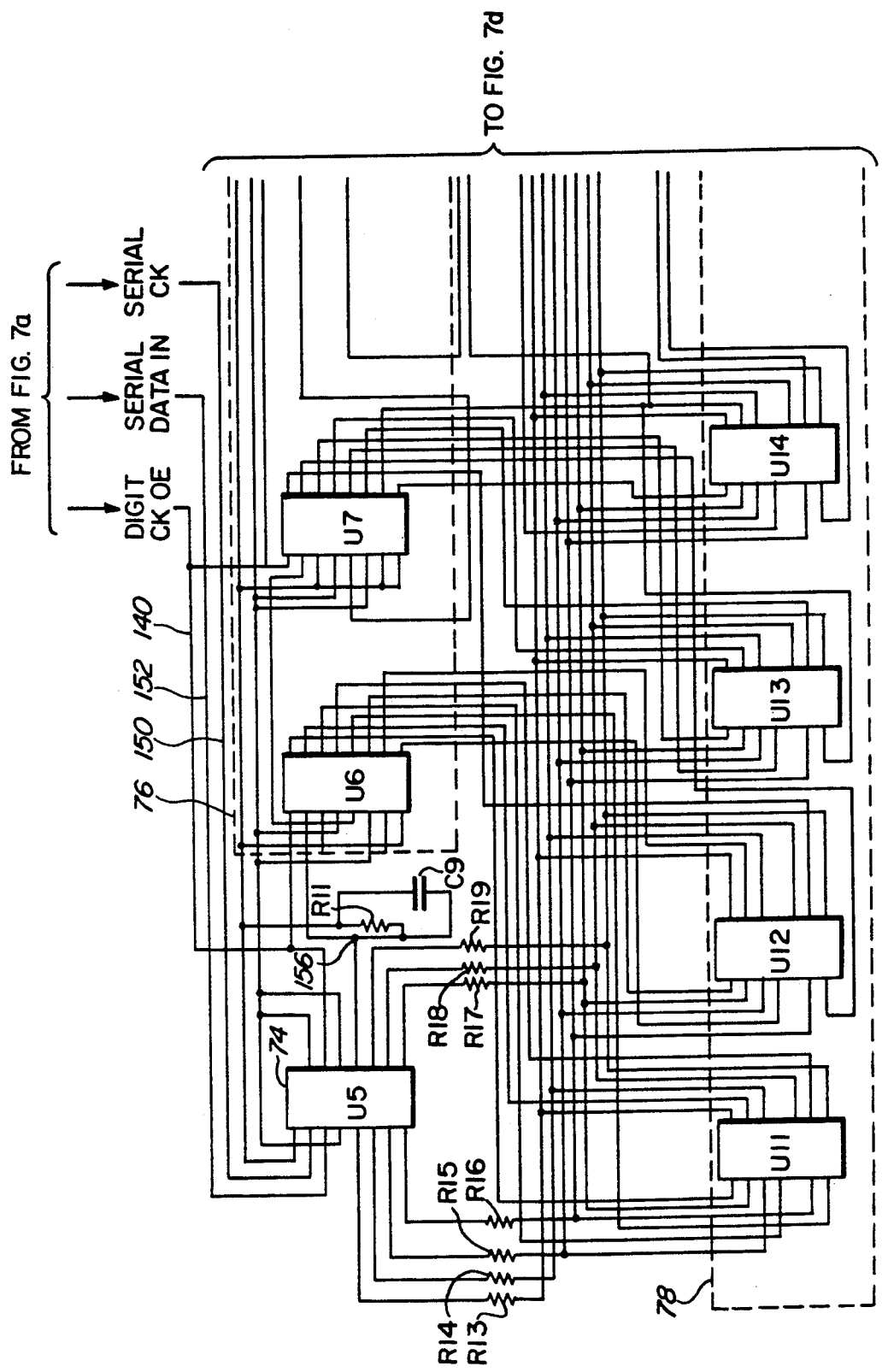
Figure 7D:
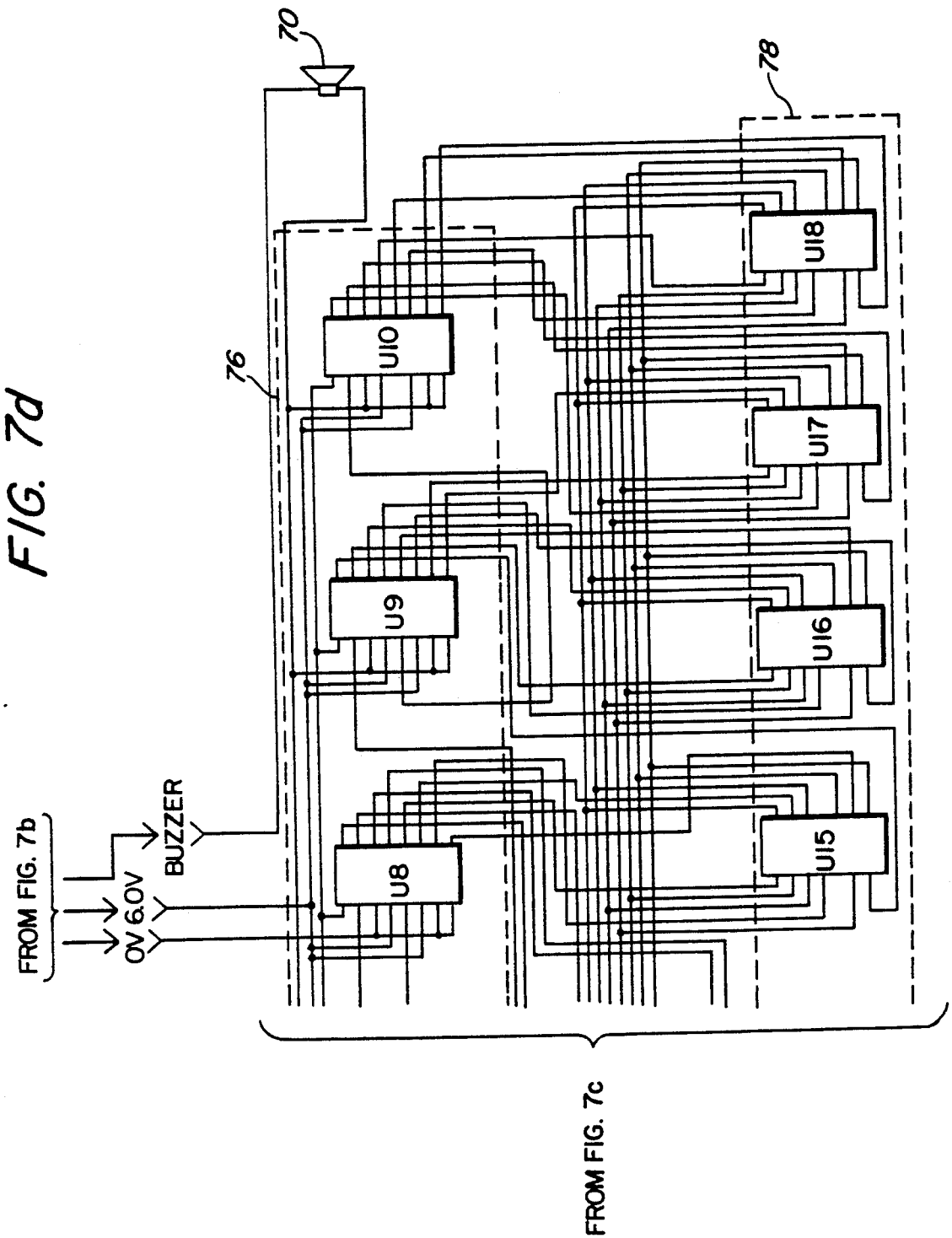

Referring now to FIGS. 7c-7d, the display section 72 is illustrated divided into several subcircuits including the anode driver 74, the shift register 76 and the LED display 78. The display section 72 is designed to have a minimum of communication lines between it and the MCU 40, so that it may be positioned a distance from the MCU 40 without the encumbrance of numerous communication lines.

Figure 8:
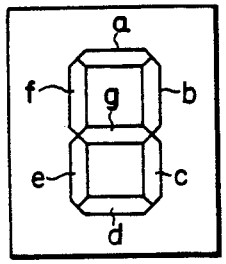
FIG. 8 is an illustration of the segments of a digit in a display.

In the preferred embodiment, the LED display 78 comprises 40 digits. It will be recognized by those skilled in the art that more or less digits may be chosen. In the preferred embodiment, each of the integrated circuits U11 through U18 comprises five LED digits for a total of forty digits that may be represented. Each digit is further divided into eight segments, typically segments labelled "a" through "g." Reference is made to FIG. 8, wherein the segments of one digit are shown proximate to their associated letter. It will be recognized by those skilled in the art that any digit or letter can be represented by applying a threshold voltage across each segment of a particular combination of the segments a through g.

Each of the integrated circuits U11 through U18 comprises seven inputs corresponding to each of the seven segments of each digit. These seven inputs are termed "anode" inputs, which are connected to the anode of each LED segment. Furthermore, each integrated circuit U11 through U18 additionally comprises five separate cathode inputs, each of which selects one of the five digits on the integrated circuit. Thus, the cathode inputs select one of the five digits on any one of the eight integrated circuits U11-U18 while the seven anode inputs determine which of the seven segments a-g are to be illuminated. By periodically displaying the digits one at a time, the display appears to be constantly illuminated due to the fact that the eye does not respond fast enough. Using this fact, the preferred embodiment energizes each digit in a cycle that will be described in the following paragraphs.

The purpose of the anode driver 74 can now be explained. Particularly, the anode driver 74 has seven outputs, each of which are connected to an anode of one of the segments. These seven outputs of the integrated circuit U5 are connected in parallel in each of the integrated circuits U11 through U18. Resistors R13 through R19 are provided between the output of U5 and the inputs to U11 through U18 in order to limit the current through any energized LED segment and thereby prevent damage to that segment.

The 40-bit shift register 76 comprises a series of five 8-bit shift registers U6-U10, each of which are connected so that their eighth and final bit is shifted to the first bit of the subsequent shift register upon the next clock pulse. Upon arriving at the eighth and final bit of the shift register U10, which is last in the sequence of shift registers U6-U10, the bit is lost upon the next clock pulse.

The anode driver 74 and the shift register 76 are both controlled by the MCU 40. More specifically, a clock for the shift register 76 is provided on a clock line 140, which connects the MCU 40 with each of the integrated circuits U6 through U10. The same digit clock line 140 is also connected to U5 in order to "enable" U5. This clocking of the shift register 76 and enabling of U5 is explained with reference to FIG. 9, which illustrates a typical clock signal waveform 140a on the clock line 140. The clock signal 140a has a period 142, the duration of which is a constant throughout a display cycle wherein forty digits are displayed in sequence in each cycle.

Figure 9:
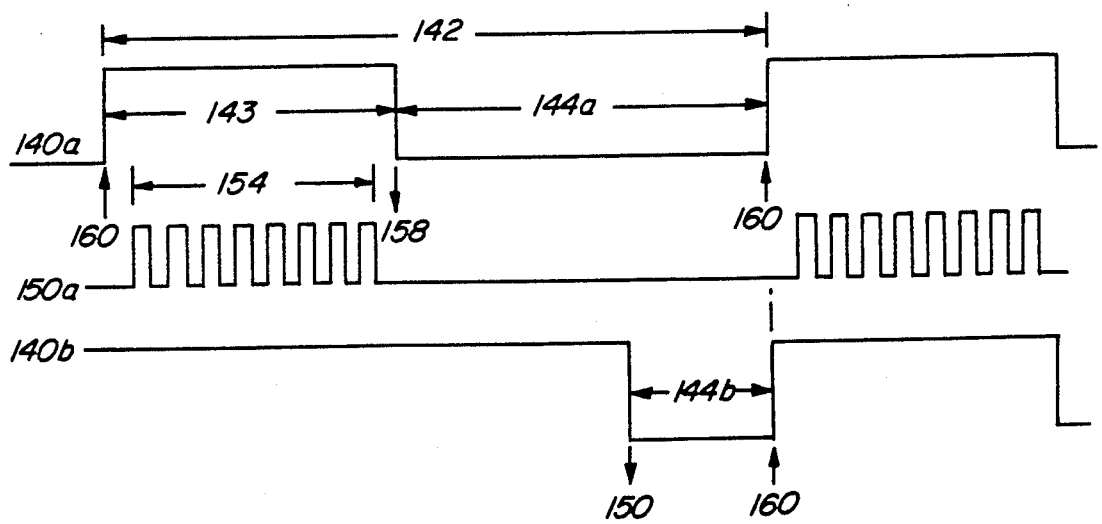
FIG. 9 is a graphical illustration of clocking waveforms used to display a series of digits.

FIG. 9 shows two possible clock signals 140a and 140b, each having a downward transition 158, and an upward transition 160. The clock signal 140 is comprised of a high portion 143 and a low portion 144, the durations of which are not necessarily equal. During each period 142, the shift register is clocked (i.e., a bit is shifted from one position to the next) at the upward transition 160 of each clock pulse. Furthermore, during the low portion 144 when the clock pulse 140 is low, the anode driver 74 becomes enabled. Therefore, the low portions 144a and 144b represent the duration of time that the anode drivers are enabled to energize the LEDs. The result is that the brightness of the display can be controlled by controlling the time period 144. The brightness control occurs because the output is enabled (the anode driver is on) only during that time period 144. The length of the low time period 144 is easily controllable in software, and in the preferred embodiment the length is adjustable by the user.

The anode driver 74 has two additional inputs from the MCU 40: a serial clock 150 and a data input 152. A typical waveform 150a for the serial clock 150 is also shown in FIG. 9. It will be noted that the combined time 154 of eight clock pulses of waveform 150a is less than the high portion 143 during which the waveform 140 remains high. Thus, in light of the previous paragraph, it is apparent that the data is clocked into the anode driver 74 during the time period during which the output is not enabled.

Seven of the eight outputs of the driver U5 are connected to the LED display 78 as previously described. The remaining eighth output is utilized in the preferred embodiment to reset the shift register 76. In other words, this eighth output provides the first bit in the string that is clocked through the shift register 76. A pull-down resistor R11 and a capacitor C9 are provided on the output 154 in order to pull the floating output of integrated circuit U5 down to zero volts. This is a design consideration that depends upon the particular integrated circuit U5 chosen in the preferred embodiment.

In summary, the operation of the display section 72 can be described as follows. After the clock 140 has been initiated, as for example to create waveforms 140a or 140b shown in FIG. 9, eight bits, seven of which represent data for the seven segments and the eighth bit representing the initial shift, are serially clocked into the driver U5. Upon the downward transition 158 of the waveform 140, all eight bits are immediately made available at the outputs of the anode driver 74, and thus, the seven segment outputs are applied to the one particular digit specified by the output of the cathode drivers of the shift register 76. The timing of the downward transition 158 with respect to the clocking of the eight bits is variable to permit different levels of brightness by varying the length of the time period 144. The energized segments of this particular digit will remain energized for the time period 144, after which the clock signal 140 makes the next upward transition 160, at which time the shift register 76 is advanced by one position to be ready to energize the next digit when the anode driver 74 is again enabled. The above display sequence will then be repeated for each of the forty digits in the preferred embodiment. To repeat the sequence, the segments for the next digit will then be clocked to the anode driver and will be enabled by the next downward transition 158 occurring in the cycle.

This same sequence is used to illuminate all forty digits in one cycle after which a time period may elapse before this cycle will be repeated again. Thus, the contents of the display is completely subject to control by the MCU 40.

Communication between the display section 72 and the MCU 40 comprises only three data lines, digit clock 140, serial data clock 152 and serial clock 150. The other two lines necessary are the two power supply lines, 100 and 106. As a result, the number of lines is minimal, i.e., only five lines connect the circuit board and power supply with the display section. A sixth line is for the buzzer 70.

The Memory Section

The memory section 80 previously described with respect to FIG. 5 will now be described in more detail with respect to FIG. 7e, which shows a circuit diagram of the memory section 80. The address latch 82 comprises two octal non-inverting latches U19, U20. These latches U19, U20 are connected to the address output of MCU 40. In the preferred embodiment, thirteen of the address lines from the MCU determine the address of a word to be accessed in either of the subsequent memory storage devices. Three other address lines from the MCU 40 to the address latch 82 determine which memory device is to be accessed, as will be later described. Thus, the outputs of the latches are connected in parallel to the address inputs of the EPROM 86 and the non-volatile storage RAM 88. In the preferred embodiment, the EPROM 86 comprises a 8K byte memory capability, which for the purposes of this discussion is assumed to be programmed with a sequence of control instructions accessed as needed by the MCU 40. The contents of the EPROM 86 are programmed therein in any well known matter, and in the preferred embodiment the EPROM 86 is programmed with a code to be later disclosed and in a manner which will be further described. In other words, as used in the preferred embodiment, the EPROM 86 is used by the MCU 40 as a read only memory, and a ROM could be substituted therefor.

The decoder 84 is connected to three output lines from the address latch 82, in order to select either the EPROM 86 or the storage RAM 88, or neither. More specifically, in the preferred embodiment, each output of the decoder 84 remains high until that particular output is selected. The output of the EPROM 86 and the storage RAM 88 is active (enabled) when low. Therefore, when the latch 82 provides a preselected specific combination of inputs to the decoder 84 (one of the eight possible combinations), only one of the memories, either the EPROM 86 or the storage RAM 88 may be enabled. If the EPROM 86 is enabled, the address supplied by the address latch 82 accesses a word which then appears on the output of the EPROM 86. If, on the other hand, the storage RAM 88 is enabled, then a further selection must be made as to whether a read or a write operation is desired.

The preferred embodiment comprises the non-volatile storage RAM 88 for the purpose of storing pertinent dive data for later access. The RAM 88 is non-volatile (static) so that the stored data remains intact in the event of power loss. Upon completion of a dive, the information stored in the storage RAM 88 can be downloaded through the MCU 40 onto the personal computer 50 as shown in FIG. 5. By applying a specific distinct combination of the three inputs to the decoder 84, the storage RAM 88 can be chosen in a similar manner as EPROM 86. However, it has been noted that the storage RAM 88 must also be capable of being written to as well as read from. The instructions to read or write from the storage RAM 88 originate in the MCU 40 and are first passed through a synchronization circuit 161, which in the preferred embodiment includes the NAND gate U23. The synchronization circuit 161 is necessary to synchronize the read and write commands originating from the MCU 40 with the enable command, also originating from the MCU 40. After the signal has passed through the synchronization circuit 161, it is then applied to the storage RAM 88 in order to either read or write, as desired, from the storage RAM 88.

Programming of EPROM in the MCU 40 and in the EPROM 86

To be operational, the MCU 40 must be programmed with software that directs the sequence of operations within the MCU 40. Using the MCU 40 of the preferred embodiment, a program that provides the steps to accomplish the functions of the MCU 40 of the present invention is included in Appendix A, attached to, and a part of, this description. It will be apparent to one skilled in the art that other programs that accomplish similar functions are within the scope of the present invention.

The process for programming the EPROM in the MCU 40 and the EPROM 86 will be described in the following section. Such programming is well known in the art, and is included here for completeness of best mode.

Figure 10:
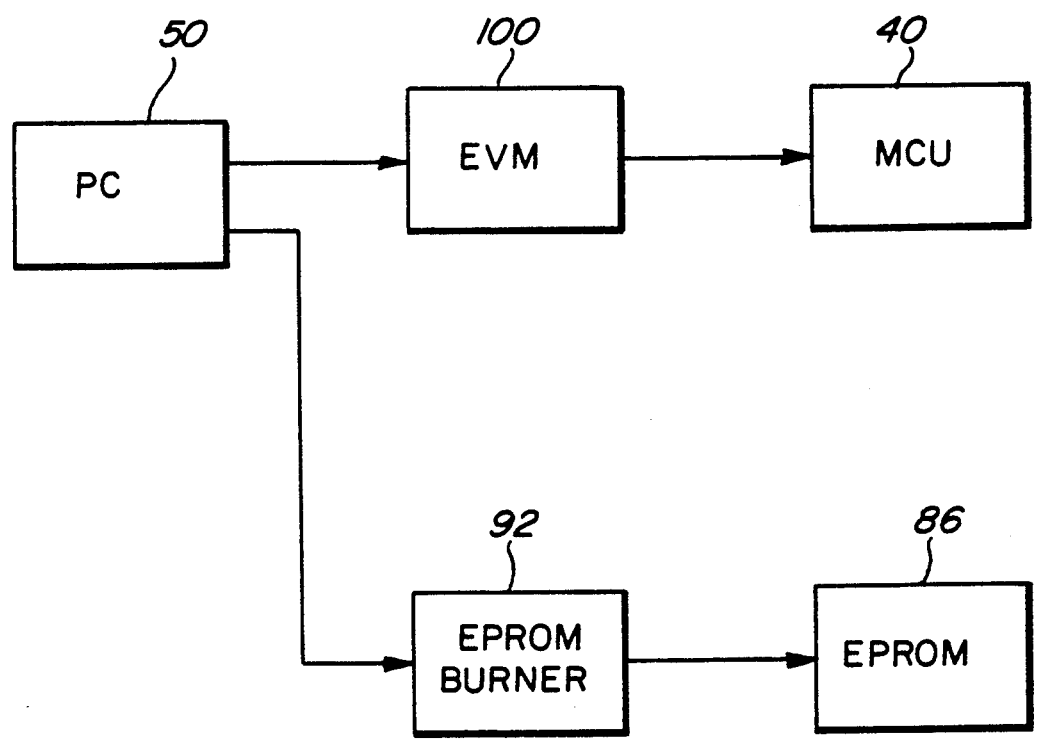
FIG. 10 is a block diagram of a system for programming the memory of the preferred embodiment.

Reference is now made to FIG. 10 wherein the system for programming the microcontroller 40 and the EPROM 86 is illustrated. In the preferred embodiment, the software routines programmed into the EEPROM in the MCU 40 and into the EPROM 86 are disclosed in Appendix A to the description.

As discussed previously, the MCU 40 utilized by applicant in the preferred embodiment is the Motorola 68HC811A2. This particular embodiment of the MCU 40 includes 2K of EEPROM, a portion of which is usable by a programmer. In the preferred embodiment, the portion of the 68HC811A2 utilized is that numbered F800 to FFFF.

To program the 68HC811A2 and the external EPROM 86, an IBM PC compatible Tandy 1000A with an available RS-232 port was first loaded with the software disclosed in Appendix A. It will be appreciated by those skilled in the art that any of a wide variety of PC computers could be used with similar results. The specific software used to assemble and format the data for loading is a cross-assembler program available from Avocet Systems, Inc. 120 Union St., Rockport, Me.

The PC 50 is connected to an evaluation module (EVM) 90 which is specifically designed to interface with the 68HC811A2. The EVM 90 is connected to the MCU 40 in any well known manner for the purpose of programming the EPROM in the MCU 40.

Programming of EPROMs is well known in the art and the following steps are one example that can be used with the preferred embodiment to program the EPROM 86 and the EPROM in the MCU 40. First, of course, the software in Appendix 1 must be entered into the PC 50. This software is then assembled by the PC by the Avocet program which creates a data file with Motorola format. In essence, this data file is a memory map of the desired algorithms. Next, the Motorola format data is downloaded to an Aprotek EPROM burner 92 which is designed to program the EPROM 86. Such EPROM burners are well known in the art, and any suitable EPROM burner may produce similar results. Data residing in locations 6000-7FFF is then programmed into the external EPROM 86 through the EPROM burner 92.

Next, the remaining data is downloaded to the EVM 90, which, using the on-board monitor, is then instructed to load this remaining part of the program into the MCU 40 EPROM at locations F800-FFFF. It will be appreciated by those skilled in the art that other methods of memory storage and programming for operation of the MCU 40 may be utilized without departing from the spirit of the invention. For example, a smaller program may be adapted to reside entirely in the MCU 40 without the need for external EPROM 86. Alternatively, the program maybe adapted to reside completely in EPROM 86, without the need to store any portion of the program in the MCU 40.

Furthermore, different MCUs may be used. A MCU other than that used in the preferred embodiment may have different memory requirements and capabilities. Accordingly, the software code for those MCUs could be adapted in any known manner to perform essentially the same operations as that specified in the assembly code provided herein. As stated above, the source code stored in the PC 50 which is programmed into the MCU 40 and the EPROM 86 is provided following this section.

Parameter Setting by Diver and Software Routines

Previously, the invention has been described in terms of the hardware and connections between the various components in the preferred embodiment. Next, the invention will be described in terms of the software and procedures used by the microprocessor in operation, beginning at power-up, through selection of dive parameters by the diver, and then through the routines occurring throughout the dive. It will be apparent how the present invention may be used, and also apparent to those skilled in the art will be ways in which it may be modified while still remaining within the principles of the present invention.

Referring first to FIG. 11, a flow chart of the main program of the preferred embodiment is shown in block form. It will be recognized by one skilled in the art that the sequence of operations shown in this flow chart may be modified in numerous ways while still retaining the principles of the present invention.

Beginning at power-up, in a block L200, the diver 10 switches the power switch 92 shown in FIG. 6. After power-up, the MCU 40 is next initialized as shown in a block L210. Initialization is effected by the reset circuit 44 shown in block in FIG. 5 and discussed with reference to FIG. 7a.

Following initialization of the MCU 40 in the block L210, the variables are initialized, as shown in the block L220. These variables include pointers, counters and memory. Next, the software sets the default dive parameters in the MCU 40, as shown in the block L230. These default dive parameters include typical values of bottom time, maximum depth and other parameters. These values may be adjusted later in the main program sequence of FIG. 11 by the diver 10.

Subsequently, the digital display 31 is made operational by first starting a 417 $\mu$s timer, which is the part of the display sequence discussed with reference to FIG. 7 that sends one character from the MCU 40 to the digital display 31. After the 417 $\mu$s timer is started, as illustrated in a block L240, the 0-240 $\mu$s delay timer is started, as illustrated in a block L250. Initially, the time chosen for this timer is determined by the default dive parameters that were set in the block L230. The length of this time determines the length of time that a particular digit will be energized, and thus determines the brightness of the display seen by the diver 10, as discussed with reference to FIG. 9, with 0 $\mu$s delay corresponding to the maximum brightness and 240 $\mu$s delay corresponding to the minimum brightness. In the preferred embodiment, while the diver is selecting the dive parameters, the delay time is set at 0 $\mu$s so that the diver 10 can easily see the instructions displayed in the next step of the main program.

After the timers in the blocks L240, L250 are operational, the digital display 31 can be illuminated with messages and prompts. In the next step, as illustrated in a block L260, the diver 10 selects dive parameters in response to prompts appearing on the digital display 31. These parameters include time of day, maximum depth desired, maximum bottom time desired, minimum air pressure desired and brightness. Selection of the dive parameters will be discussed more fully with reference to FIG. 12.

After the diver 10 has selected dive parameters, the 524 ms timer is started, as illustrated in a block L270. In this block, several interrupt routines are implemented to read the sensors at regular time intervals, to calculate warnings, to update the display and to save data in the self-powered storage RAM. These functions will be discussed more thoroughly with reference to FIG. 13.

After the 524 ms timer routine has been started, as illustrated in the block L270, the MCU 40 is set to a low-power mode to conserve energy, as shown in a block L280, where it waits for interrupts. When an interrupt occurs, the MCU 40 resumes operation and performs the procedures indicated by the particular interrupt. For example, the sensors are regularly read by the interrupt schedule, warnings are calculated, and dive data is stored every twenty seconds. When an interrupt routine has completed execution, the MCU 40 returns to the low-power mode to conserve energy. When the dive is over and the diver 10 has surfaced, the diver 10 may switch the power switch 96 to the off state. Later, when he again turns on the power, the above-described sequence of steps shown in FIG. 11 will repeat.

As an additional feature, bottom time automatically begins counting from a zero value when the diver has descended below the surface to a predetermined depth which may, for example, be a depth of five feet sensed by the depth sensor. It will be obvious to one skilled in the art that other depths may be appropriate to begin counting bottom time.

Decompression tables are included in the software, and bottom time is continually compared with the values shown on the decompression tables for the actual maximum depth of dive. A warning is provided to the diver beginning several minutes before he has exceeded the bottom time for a no-decompression dive. In the preferred embodiment, the warning begins approximately five minutes before maximum bottom time is exceeded. The preferred embodiment uses the standard U.S. Navy decompression tables, but it will be obvious to one skilled in the art that any of a plurality of algorithms may be employed to make a determination that the diver may need decompression stops before surfacing. In the disclosed embodiment, the microprocessor calculates and directs display of the length and duration of the decompression stops while the diver is in the process of decompressing. The microprocessor in other embodiments (not disclosed) may provide warnings if the diver does not follow the prescribed decompression procedure.

Referring now to FIG. 12, the diver's selection of dive parameters previously described with reference to the block L260 of FIG. 11 can be described in more detail. In the preferred embodiment, the MCU 40 moves sequentially through the sequence of steps illustrated in blocks L261 through L267. To move to the next level, for example to move from the time of day input illustrated in the block L263 to the maximum depth input of the block L264, the diver 10 simultaneously presses the switches S2, S3 shown in FIG. 7. It will be appreciated by those skilled in the art that the particular sequence of switch operations that in the preferred embodiment produce a given result may be varied in other embodiments to produce a different result. The particular sequence of switch operations chosen is a design choice that is well within the abilities of one of ordinary skill in the art. Furthermore, other embodiments may produce a different sequence of prompts that allow the diver to select other parameters or to select the same parameters in a different order.

Specifically, the first prompt, illustrated in the block L261 requests the diver to input whether or not he wants the data stored in the self-powered storage RAM 88 to be downloaded to an external PC. If the diver 10 elects to download the data, by for example pressing either switch S2 or S3 separately, the MCU 40 downloads the data as illustrated in a block L262. Of course, the connector 48 and the PC 50 must first be connected as illustrated in the block diagram of FIG. 5.

After downloading is complete, or if the diver 10 does not elect to download the data, the diver 10 is prompted to input the time of day, as illustrated in the block L263. By manipulating the switches S2, S3, the diver 10 can set the time, after which he can move to the next prompt, illustrated in the block L264, which requests the diver to input the maximum depth he plans to dive. By manipulating the switches S2, S3, the diver can input a selected maximum depth, or of course he can simply select the default value by simultaneously pressing both switches S2, S3 to move to the next prompt, illustrated in the block L265, which requests an input of the maximum bottom time. In a similar manner, the diver 10 can make his selection for maximum bottom time and move sequentially through the block L266, which requests the diver 10 to input a minimum air pressure, and the block L267, which requests the diver 10 to select a brightness level for the digital display 31. Following those selections, the MCU 40 then proceeds to the operations shown in the blocks L270 and L280 previously described with reference to FIG. 11, which begin the interrupt routines and low-power operation.

Figure 13:
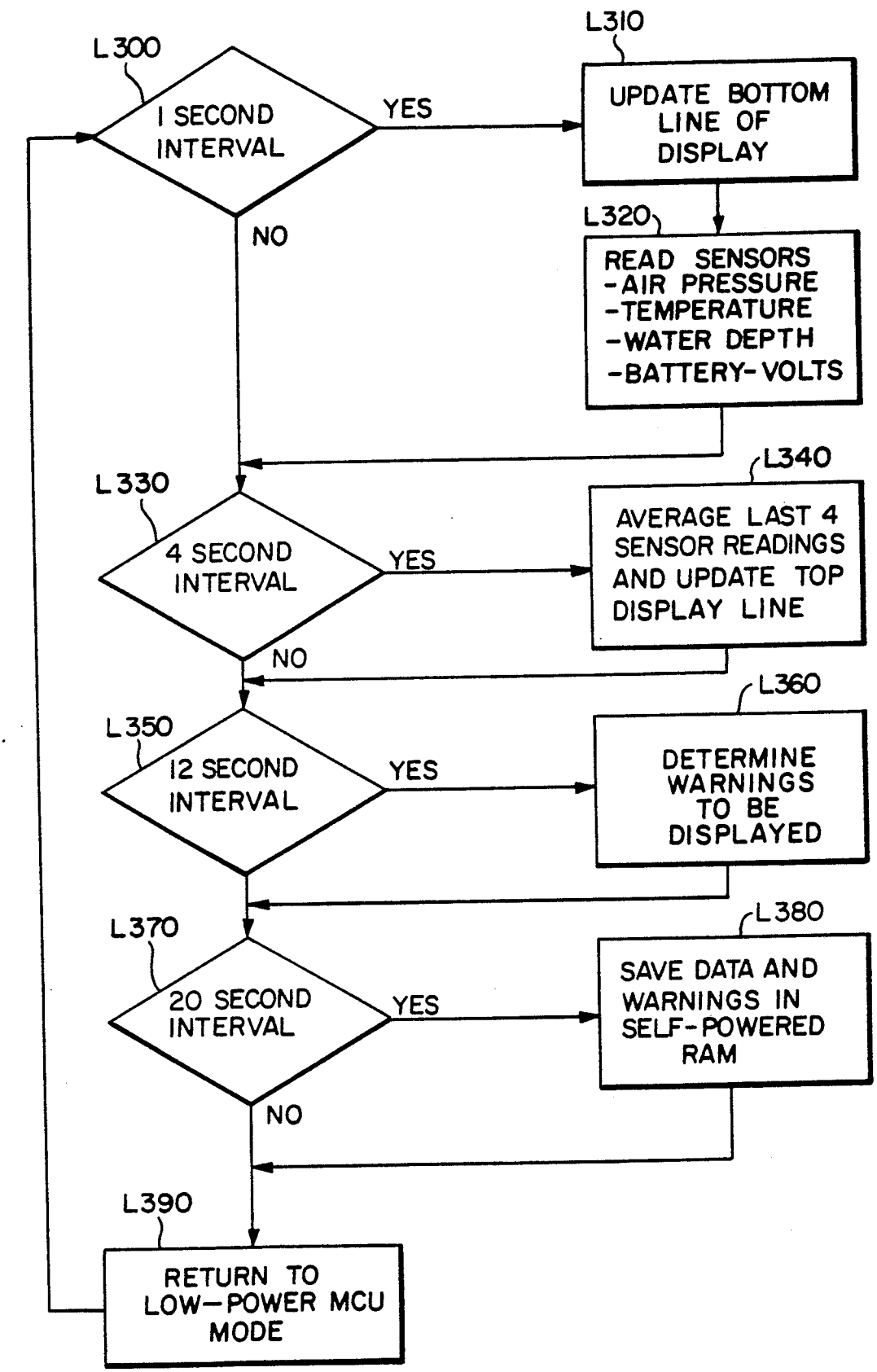
FIG. 13 is a flow chart illustrating the sensor interrupt routine of the preferred embodiment.

Referring now to FIG. 13, the sensor interrupt routines discussed with reference to the block L280 of FIG. 11 can be described in more detail.

The sensor interrupt routines occur at discrete time intervals, i.e., every 524 ms the sensor interrupt routine is executed. It is responsible for keeping track of the time in minutes, hours and seconds. FIG. 13 shows the major events occurring each time the sensor interrupt routine is executed.

Every second, as illustrated in the box L300, the bottom line of the digital display 31 is updated, as illustrated in the block L310. The bottom line may contain the standard time, updated every second, or it may contain warnings that last for one or several seconds. Also every second, as illustrated in the block L320, the MCU 40 reads the sensors 56, 60, 64 and the battery voltage from the voltage dividers 66.

At every four second interval, as illustrated in the block L330, the previous four sensor readings are averaged and the top display line, which displays the sensor readings, is updated to show the new readings. This operation is illustrated in a block L340.

At each twelve second interval, as illustrated in the block L350, all sensed values from the preceding twelve seconds are analyzed to determine which (if any) warnings are to be displayed on the display bottom line. This analysis operation is illustrated in a block L360.

At each twenty second interval, as illustrated in the block L370, the averaged pressure, depth and temperature values are saved in the self-powered storage RAM 88. Furthermore, any warnings that have been provided during that interval are similarly saved. This operation is illustrated in a block L390. After a dive, the diver 10 can download this data to the PC 50 as described with reference to the block L262 of FIG. 12.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced with their scope.

What is claimed is:

1. A diver's information system, comprising:
   one or more sensors, each of said sensors providing a data signal indicative of a sensed quantity;
   a control unit coupled to the sensors for receiving and processing the data signal; and
   a display means coupled to the control unit for displaying information received from the control unit, said display means comprising:
   an imaging system for displaying information in the diver's line of sight, said imaging system including a spectrally selective reflective surface positioned within the diver's range of sight, and at a distance with respect to the diver's eyes that is shorter than the accommodation distance of the diver's eyes, such that the diver cannot comfortably focus on the spectrally selective reflective surface, said imaging system further including means for forming a reflection of the displayed information on the spectrally selective reflective surface, while simultaneously forming a virtual image of the displayed information located beyond the spectrally selective reflective surface at a distance greater than the accommodation distance, so that the diver can comfortably focus on the displayed information.

2. A diver's information system as claimed in claim 1, further including a face mask having a transparent face plate for viewing the environment, said face plate being positioned at a distance with respect to the diver's eyes that is shorter than the accommodation distance of the diver's eyes, wherein said face plate comprises the spectrally selective reflective surface.

3. A diver's information system as claimed in claim 1, wherein the spectrally selective reflective surface reflects substantially red light.

4. A diver's information system as claimed in claim 1, wherein the display means includes an illuminated display as an input to the imaging system.

5. A diver's information system as claimed in claim 4, wherein the imaging system includes a second reflective surface in the optical path between the illuminated display and the spectrally selective reflective surface.

6. A diver's information system as claimed in claim 4, wherein the illuminated display includes a plurality of LED digits.

7. A diver's information system as claimed in claim 4, wherein the LED digits emit red light, and wherein the spectrally selective reflective surface reflects substantially red light.

8. A diver's information system, comprising:
one or more sensors, each providing a data signal indicative of a sensed quantity;
a central control unit for receiving and processing the data signal from the sensors;
display means comprising a plurality of illuminatable digits or other characters for displaying information;
presentation means for presenting the displayed information in the diver's line of sight such that the diver can view the display simultaneously with a substantially unobstructed view of the underwater environment; and
a serial communication link coupling the display means with the central control unit, said communication link having a clock signal for choosing one of the plurality of digits to be displayed and also for determining the brightness of the chosen digit, said communication link also having a serial clock line and a data input line for serially clocking data to the display means, said clocked data being indicative of the shape of the chosen digit;
whereby the central control unit controls the brightness of the display and provides the information to be displayed on said display.

9. A diver's information system as claimed in claim 8, wherein said presentation means includes an imaging system having a partially reflecting surface located within the diver's line of sight through the face plate of the diver's mask so that a reflection is formed on the partially reflecting surface, wherein a virtual image appears to the diver to be formed beyond the location of said partially reflecting surface.

10. A diver's information system as claimed in claim 9, wherein the display means emits red light, and wherein the partially reflecting surface reflects substantially red light.

11. A diver's information system, comprising:
one or more sensors, each of said sensors providing a data signal indicative of a sensed quantity;
a control unit coupled to the sensors receiving and processing the data signal; and
an imaging system coupled to the control unit for displaying information received from the control unit, said imaging system comprising:
a display for presenting said information from the control unit;
a reflective filter positioned within the diver's range of sight, and at a distance with respect to the diver's eyes that is shorter than the accommodation distance of the diver's eyes, such that the diver cannot comfortably focus on the reflective filter; and
a reflective surface positioned within the imaging system so as to reflect information presented by the display onto the reflective filter to form a virtual image of the displayed information at a location such that the diver can comfortably focus his eyes on the displayed information.

12. A diver's information system as defined in claim 11, wherein said information system includes a face mask having a face plate, and wherein said face plate comprises the reflective filter.

13. A diving status system for a diver, comprising:
one or more sensors, each providing a data signal indicative of a sensed quantity;
a control unit for receiving and processing the data signal;
a display for optically presenting the information from the control unit to the diver;
imaging means for projecting the optical information from said display, the optical information being perceived by the diver as longer than the accommodation distance of the diver's eyes so that the diver can simultaneously view the optical information and the surrounding environment.

* * * * *